United States Patent
Shimizu et al.

(10) Patent No.: US 6,275,607 B1
(45) Date of Patent: Aug. 14, 2001

(54) COLOR CONVERSION TABLE CONSTRUCTION CONVERSION METHOD AND COMPUTER-READABLE RECORDING MEDIUM HAVING COLOR CONVERSION TABLE CONSTRUCTION CONVERSION PROGRAM RECORDED THEREON

(75) Inventors: Masayoshi Shimizu; Shoji Suzuki; Satoshi Semba, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/022,484

(22) Filed: Feb. 12, 1998

(30) Foreign Application Priority Data

May 9, 1997 (JP) .................................... 9-241491

(51) Int. Cl.$^7$ ........................................... G06K 9/00
(52) U.S. Cl. ................................. 382/167; 358/523
(58) Field of Search ........................... 382/167; 358/1.9, 358/504, 523, 518

(56) References Cited

U.S. PATENT DOCUMENTS

| 4,929,978 | 5/1990 | Kanamori et al. | 355/38 |
| 5,121,196 | 6/1992 | Hung | 358/75 |

FOREIGN PATENT DOCUMENTS

| 0 676 892 | 10/1995 | (EP) . |
| 0 706 287 | 4/1996 | (EP) . |
| 7-95431 | 4/1995 | (JP) . |
| 7-123280 | 5/1995 | (JP) . |
| 7-307872 | 11/1995 | (JP) . |

OTHER PUBLICATIONS

Takuya Kawamura, et al., "Device Independent Color Reproduction and Evaluation of Hardcopy in Scanner—Printer System," Technical Report of IEICE (Journal of the Institute of Electronics, Information and Communication Engineers), Mar., 1993.

Primary Examiner—Yon J. Couso
(74) Attorney, Agent, or Firm—Staas & Halsey LLP

(57) ABSTRACT

The invention provides a technique regarding color conversion table construction conversion and makes it possible to convert a construction of an originally present color conversion table efficiently at a high speed into another construction which includes least and necessary color data in a uniform distribution so as to facilitate color conversion. The color conversion table construction conversion method includes the data production interval setting step of setting data production intervals in a first color space based on a data dispersion in one of the first color space and a second color space, the data production step of increasing the number of data representative of the corresponding relationships of colors at the thus obtained data production intervals, and the data selection step of selecting some data from either one or both of the data which originally construct the color conversion table and the increased data.

17 Claims, 24 Drawing Sheets

$L^* a^* b^*$ SPACE

YMC SPACE

Y M C SPACE  L*a*b* SPACE

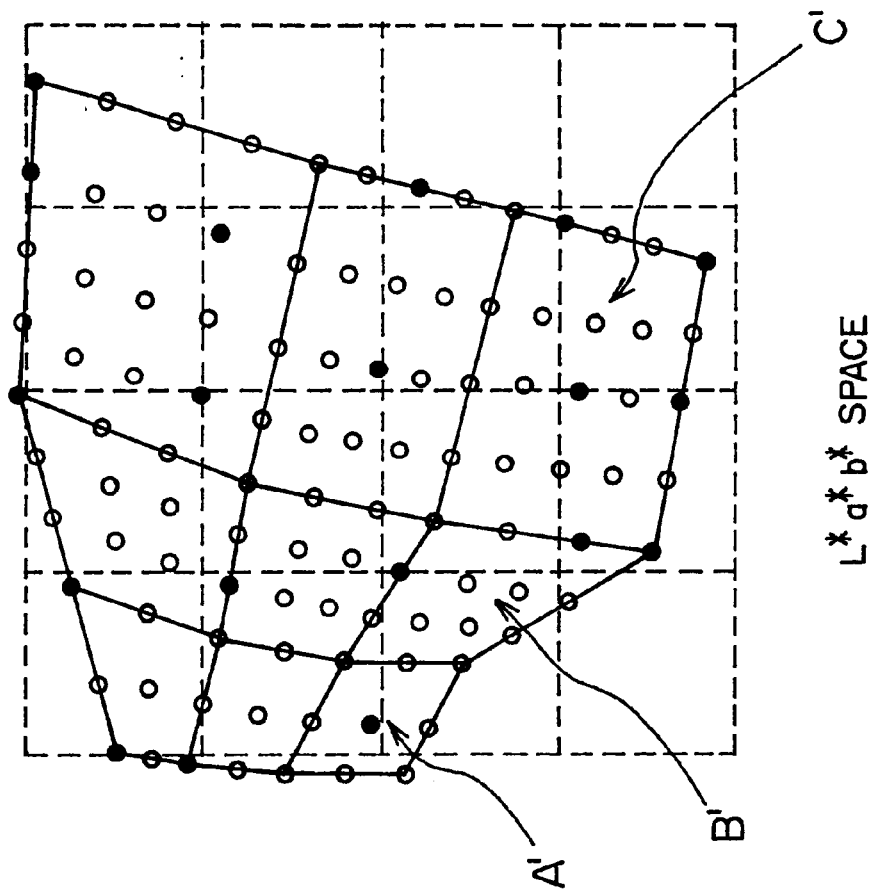
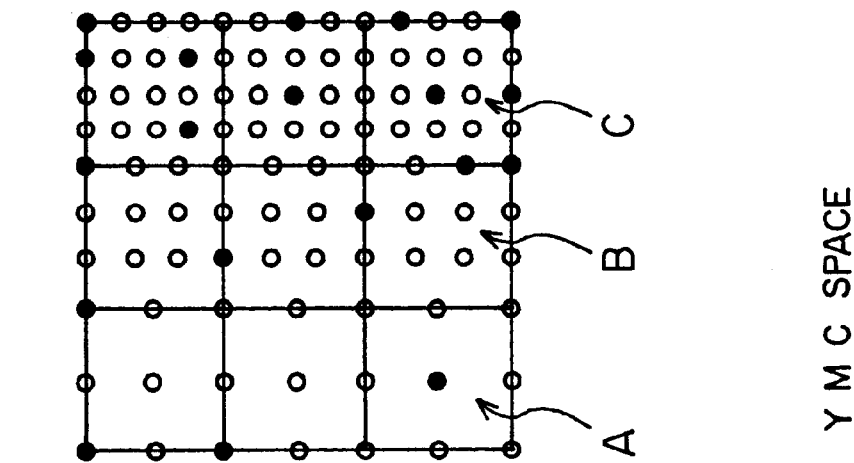

| YMC NUMBERS | L*a*b* VALUES |
|---|---|
| 000 | $L_0$ $a_0$ $b_0$ |
| 001 | $L_1$ $a_1$ $b_1$ |
| 002 | $L_2$ $a_2$ $b_2$ |
| OMITTED | |
| 008 | $L_8$ $a_8$ $b_8$ |
| 010 | $L_9$ $a_9$ $b_9$ |
| OMITTED | |
| 887 | $L_{727}$ $a_{727}$ $b_{727}$ |
| 888 | $L_{728}$ $a_{728}$ $b_{728}$ |

41 : FIRST COLOR CONVERSION TABLE

FIG. 10

| $L^*a^*b^*$ NUMBERS | YMC VALUES | $L^*a^*b^*$ CLOSENESS DEGREE (DISTANCE SQUARED) |
|---|---|---|
| 0 0 0 | $Y_0 M_0 C_0$ | $D_0$ |
| 0 0 1 | $Y_1 M_1 C_1$ | $D_1$ |
| 0 0 2 | $Y_2 M_2 C_2$ | $D_2$ |
| OMITTED | | |
| 0 0 20 | $Y_{20} M_{20} C_{20}$ | $D_{20}$ |
| 0 1 0 | $Y_{21} M_{21} C_{21}$ | $D_{21}$ |
| OMITTED | | |
| 10 20 19 | $Y_{4849} M_{4849} C_{4849}$ | $D_{4849}$ |
| 10 20 20 | $Y_{4850} M_{4850} C_{4850}$ | $D_{4850}$ |

42 : SECOND COLOR CONVERSION TABLE

L*a*b* SPACE

RGB SPACE

| RGB NUMBER | R G B VALUES | $L^*a^*b^*$ VALUES |
|---|---|---|
| 000 | $R_0$ $G_0$ $B_0$ | $L_0$ $a_0$ $b_0$ |
| 001 | $R_1$ $G_1$ $B_1$ | $L_1$ $a_1$ $b_1$ |
| 002 | $R_2$ $G_2$ $B_2$ | $L_2$ $a_2$ $b_2$ |
| OMITTED | | |
| 008 | $R_8$ $G_8$ $B_8$ | $L_8$ $a_8$ $b_8$ |
| 010 | $R_9$ $G_9$ $B_9$ | $L_9$ $a_9$ $b_9$ |
| OMITTED | | |
| 887 | $R_{727}$ $G_{727}$ $B_{727}$ | $L_{727}$ $a_{727}$ $b_{727}$ |
| 888 | $R_{728}$ $G_{728}$ $B_{728}$ | $L_{728}$ $a_{728}$ $b_{728}$ |

44 : FIRST COLOR CONVERSION TABLE

FIG. 17

| NEW RGB NUMBERS | RGB NUMBERS | RGB INTERPOLATION COEFFICIENTS | RGB CLOSENESS DEGREE (DISTANCE SQUARED) |
|---|---|---|---|
| 000 | r0 g0 b0 | i0 j0 k0 | D0 |
| 001 | r1 g1 b1 | i1 j1 k1 | D1 |
| 002 | r2 g2 b2 | i2 j2 k2 | D2 |
| OMITTED | | | |
| 0017 | r17 g17 b17 | i17 j17 k17 | D17 |
| 010 | r18 g18 b18 | i18 j18 k18 | D18 |
| OMITTED | | | |
| 17 17 16 | r5830 g5830 b5830 | i5830 j5830 k5830 | D5830 |
| 17 17 17 | r5831 g5831 b5831 | i5831 j5831 k5831 | D5831 |

45 : SECOND COLOR COVERSION TABLE

FIG. 18

| NEW RGB NUMBERS | L a b VALUES | RGB CLOSENESS DEGREE (DISTANCE SQUARED) |
|---|---|---|
| 000 | $L_0 a_0 b_0$ | $D_0$ |
| 001 | $L_1 a_1 b_1$ | $D_1$ |
| 002 | $L_2 a_2 b_2$ | $D_2$ |
| OMITTED | | |
| 0 0 17 | $L_{17} a_{17} b_{17}$ | $D_{20}$ |
| 0 1 0 | $L_{18} a_{18} b_{18}$ | $D_{21}$ |
| OMITTED | | |
| 17 17 16 | $L_{5830} a_{5830} b_{5830}$ | $D_{5830}$ |
| 17 17 17 | $L_{5831} a_{5831} b_{5831}$ | $D_{5831}$ |

46 : THIRD COLOR CONVERSION TABLE

F I G. 20
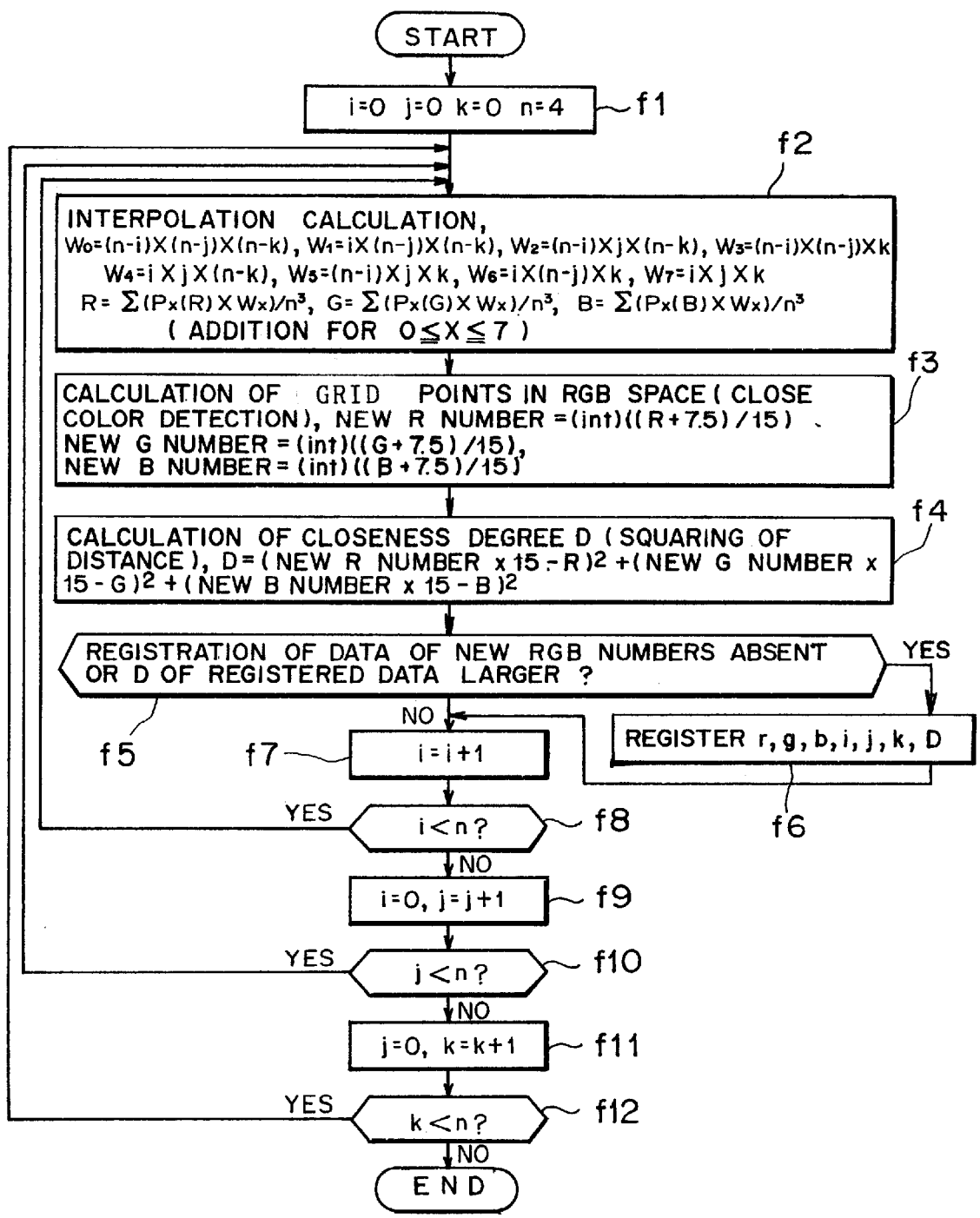

COLOR CONVERSION TABLE CONSTRUCTION CONVERSION METHOD AND COMPUTER-READABLE RECORDING MEDIUM HAVING COLOR CONVERSION TABLE CONSTRUCTION CONVERSION PROGRAM RECORDED THEREON

BACKGROUND OF THE INVENTION

1. Field of the Invention

This invention relates to a method of converting a construction of a color conversion table for converting colors between different color spaces and a computer-readable recording medium on which a program for converting a construction of a color conversion table is recorded.

2. Description of the Related Art

Generally, a color space represents a coordinate system for representing colors, and various color spaces are available. Such a device as a printer or a scanner has a color space of the device-dependent type which relies upon the device such as a "YMC (Yellow Magenta Cyan)" color space or an "RGB (Red Green Blue)" color space. For example, with a printer which has a minimum value of 0 and a maximum value of 255 as an output signal value when it outputs a color, a color to be outputted is represented (designated) by YMC values within the range from 0 to 255. However, printers of different makers may not necessarily output the same color even if the same YMC values are designated.

Meanwhile, in addition to such color spaces of the device-dependent type as described above, different color spaces "L*a*b*", "XYZ" and so forth of the device-independent type are used widely. Since the color spaces of the device-independent type can provide absolute color representations, they are often used for an intermediate color space when color conversion is performed between color spaces of different devices.

For example, in order to convert an image (data) represented in the "RGB" form read in by a scanner into data represented in the YMC form, the data represented in the "RGB" form are converted into data represented in the L*a*b* form once, and then the data of the L*a*b* form are converted into YMC data.

Here, in order to perform color conversion between different color spaces in this manner, a method which uses a color conversion table which represents corresponding relationships of colors between the color spaces is used widely. Normally, in a conversion method which uses a color conversion table, when a color registered in the color conversion table is to be converted, a corresponding relationship registered in the color conversion table is utilized to effect the conversion, but when a color which is not registered in the color conversion table, interpolation is performed based on data registered in the color conversion table to effect conversion of the color.

For example, when an outputting device such as a printer is handled, a color conversion table constructed from colors of a color space obtained by an ordinary color chart calorimeter can be formed, in a color space of the outputting device, as a grid type conversion table, but in another color space of the device-independent type, it is difficult to form the color conversion table as a grid type conversion table. Therefore, usually a color of an image represented by a color space of the device-independent type is converted. Consequently, conversion for determination of a color in a color space of the device-dependent type from a color in another color space of the device-independent type is important.

However, as well known in the art, when it is tried to determine a color of another color space (refer to an arrow mark B of FIG. 25) by interpolation using a color conversion table constructed from a color space (refer to an arrow mark A of FIG. 25) which has a grid-like distribution, it can be determined at a high speed by simple interpolation calculation, but when it is tried to determine a color of a color space by interpolation using a color conversion table constructed from a color space which does not have a grid-like distribution, high speed interpolation is very difficult.

In order to solve such a subject as just described, such a technique as disclosed in Japanese Patent Laid-Open Application No. Heisei 7-95431 has been proposed. According to the technique, a method called convex interpolation is used so that interpolation may be applied to conversion between data which are not present on grid points in different color spaces, and colors in a space of the device-dependent type corresponding to colors at grid points in another space of the device-independent type are determined in advance by convex interpolation and corresponding relationships between them are registered in a reverse color conversion table (which has a grid-like shape in-the space of the device-independent type) so that, by effecting color conversion processing later using the reverse color conversion table, high speed color conversion may be performed by interpolation of colors of a simple grid-like distribution.

Further, in order to solve the subject described above, another method has been proposed in "Device Independent Color Reproduction and Evaluation of Hardcopy in Scanner-Printer System" in a publication of the Institute of Electronics, Information and Communication Engineers (Technical Report of IEICE, IE92-121). According to the technique, interpolation calculation is performed between colors which are distributed like a grid in a YMC space and those colors which are distributed like a grid in an L*a*b* space are selected from a result of the calculation to produce a grid-like color conversion table in the L*a*b* color space.

Further, for interpolation in a color space which does not have a grid-like distribution as described above, a method wherein interpolation is performed with a weight which increases in reverse proportion to the fourth power of a distance has been proposed already. However, where the method is used, an influence upon interpolation processing called scalloping occurs.

In order to solve the subject just mentioned. such a technique as disclosed in Japanese Patent Laid-Open Application No. Heisei 7-307872 has been proposed. According to the technique, the number of data which construct a color conversion table is increased by linear interpolation and the thus increased data are registered to produce another color conversion table having a larger number of components (having smaller distances between components). In this manner, a color conversion table having a number of data larger than the number of data obtained by actual measurement is produced to reduce the time required for production of a conversion table and allow color conversion with a high degree of accuracy.

However, the techniques described above individually have the following subjects to be solved.

First, the technique disclosed in Japanese Patent Laid-Open Application No. Heisei 7-95431 has a subject in that, since colors in a color space of the color-dependent type corresponding to colors at grid points in another color space of the device-independent type are determined by convex interpolation to produce a reverse color conversion table, a large amount of calculation is required to produce the reverse color conversion table and remarkably much time is required.

It is examined here, for example, to convert a color conversion table which has a grid-like distribution in a YMC space of the outputting device-dependent type and does not have a grid-like distribution in an L*a*b* space of the device-independent type into another color conversion table which has a grid-like distribution in the L*a*b* space. However, since normally the number of data of a color conversion table is approximately several hundreds, it is assumed that the first-mentioned color conversion table has 729 colors in the YMC color space which has 9 gradations for each of Y, M and C and also the color conversion table to be produced newly which has a grid-like distribution in the L*a*b* space has 729 colors.

In this instance, with the technique described above, in order to derive a plurality of (at least four) points which are at shortest distances to each point to be obtained by interpolation, for each of colors (729 colors) at L*a*b* grid points to be produced by interpolation, a plurality of points must be selected from within different colors (729 colors) which are present originally and have a non-grid-like distribution in the L*a*b* space. Accordingly, with the present technique, calculation of a distance must be performed by 729×729×4 times, and also complicated discrimination of convex interpolation must be performed by 729 times.

Meanwhile, with the technique disclosed in the publication of the Institute of Electronics, Information and Communication Engineers (Technical Report of IEICE, IE92-121) mentioned hereinabove, since the CBS (Cubic Binary Search) method which calculates a point nearest to a grid point at a high speed cannot be applied because color data (samples) are distributed at random on coordinate (grid) systems on both of the input and output sides of a conversion system of an inputting device (imaging system), there is a subject that much time is required for processing for color conversion.

Further, the technique has another subject that, also in a system other than such an imaging system as mentioned above, since the number of colors to be produced by interpolation calculation is determined without taking a manner of looking of a color (a difference in color in an L*a*b* space or the like) from a human being into consideration, a large number of colors very close to one another are sometimes produced and a sufficiently high processing speed cannot be achieved.

On the other hand, with the technique disclosed in Japanese Patent Laid-Open Application No. Heisei 7-307872, while it is possible to reduce the influence of scalloping to cause color data to be distributed regularly (to produce a regular interval dispersion of colorimetry signals) in a space of the device-dependent type by increasing the number of color data which construct a color conversion table, it is very difficult to cause color data to be distributed regularly in a similar manner in a space of the device-independent type. Consequently, the technique has a subject in that an easy interpolation method such as three line interpolation (eight point cube interpolation) which can be applied in regard to a grid-like color conversion table cannot be used in a space of the device-independent type.

SUMMARY OF THE INVENTION

It is an object of the present invention to provide a color conversion table construction conversion method and a computer-readable recording medium having a color conversion table construction conversion program recorded thereon by which a construction of an originally existing conversion table can be converted efficiently at a high speed into another construction which includes least and necessary color data in a uniform distribution and allows easy color conversion.

In order to attain the object described above, according to the present invention, color data representative of corresponding relationships of colors between different color spaces are increased by interpolation based on a dispersion (intervals in distribution) of originally existing color data, and necessary data are selected from among the originally existing color data and the color data increased by the interpolation.

More particularly, according to an aspect of the present invention, there is provided a color conversion table construction conversion method for converting a construction of a color conversion table representative of corresponding relationships of colors between a first color space and a second color space, comprising the data production interval setting step of setting data production intervals in the first color space based on a data dispersion in one of the first color space and the second color space, the data production step of increasing the number of data representative of the corresponding relationships of colors at the data production intervals obtained by the data production interval setting step, and the data selection step of selecting some data from either one or both of the data which originally construct the color conversion table and the data increased by the data production step.

With the color conversion table construction conversion method, since color data representative of corresponding relationships of colors between different color spaces are increased by interpolation based on a data dispersion (intervals in distribution) of originally existing color data and then only necessary data from among the increased data and the originally existing data are selected, a new color conversion table in which color data are distributed uniformly and which is effective to realize color conversion with a higher degree of accuracy can be produced efficiently at a high speed from necessary and least data.

According to another aspect of the present invention, there is provided a color conversion table construction conversion method for converting a construction of a color conversion table representative of corresponding relationships of colors between a first color space and a second color space, comprising the data production step of producing corresponding relationships between colors in the second color space and coefficients necessary for production calculation of colors in the first color space corresponding to the colors in the second color space to increase the number of data representative of the corresponding relationships of colors, the data selection step of selecting some data from either one or both of the data which originally construct the color conversion table and the data increased by the data production step, and the color calculation step of calculating, regarding the data selected by the data selection step, colors in the first color space from the coefficients necessary for color production calculation in the first color space produced by the data production step.

With the color conversion table construction conversion method, since corresponding relationships between colors in a second color space and coefficients necessary for production calculation of colors in a first color space corresponding to the colors in the second color space are produced to increase the number of data representative of the corresponding relationships of colors and color production calculation processing can be performed only for color data which are necessary for interpolation, data calculation processing can be performed at a higher speed.

According to a further aspect of the present invention, there is provided a computer-readable recording medium having a color conversion table construction conversion program recorded thereon, the color conversion table construction conversion program causing, in order to convert a construction of a color conversion table representative of corresponding relationships of colors between a first color space and a second color space, a computer to execute the data production interval setting procedure for setting data production intervals in the first color space based on a data dispersion in one of the first color space and the second color space, the data production procedure for increasing the number of data representative of the corresponding relationships of colors at the data production intervals obtained by the data production interval setting procedure, and the data selection procedure for selecting some data from either one or both of the data which originally construct the color conversion table and the data increased by the data production procedure.

According to a still further aspect of the present invention, there is provided a computer-readable recording medium having a color conversion table construction conversion program recorded thereon, the color conversion table construction conversion program causing, in order to convert a construction of a color conversion table representative of corresponding relationships of colors between a first color space and a second color space, a computer to execute, the data production procedure producing corresponding relationships between colors in the second color space and coefficients necessary for production calculation of colors in the first color space corresponding to the colors in the second color space to increase the number of data representative of the corresponding relationships of colors, the data selection procedure for selecting some data from either one or both of the data which originally construct the color conversion table and the data increased by the data production procedure. and the color calculation procedure for calculating, regarding the data selected by the data selection procedure, colors in the first color space from the coefficients necessary for color production calculation in the first color space produced by the data production procedure.

With each of the computer-readable recording media, since color conversion processing can be performed using the computer-readable recording medium on which the color conversion table construction conversion program is recorded, wide spreading of the conversion method of the present invention can be anticipated very much.

Further objects, features and advantages of the present invention will become apparent from the following detailed description when read in conjunction with the accompanying drawings in which like parts or elements are denoted by like reference characters.

BRIEF DESCRIPTION OF THE DRAWINGS

FIGS. 7(a) and 7(b) are diagrammatic views illustrating corresponding relationships of colors between the YMC space and the L*a*b* space used in the color conversion table construction conversion method of the first embodiment of the present invention, respectively:

FIG. 10 is a diagrammatic view illustrating an example of a second color conversion table used in the color conversion table construction conversion method of the first embodiment of the present invention;

FIG. 17 is a diagrammatic view illustrating an example of a second color conversion table used in the color conversion table construction conversion method of the second embodiment of the present invention;

FIG. 18 is a diagrammatic view illustrating an example of a third color conversion table used in the color conversion table construction conversion method of the second embodiment of the present invention;

FIG. 20 is a flow chart illustrating the color conversion table construction conversion method of the second embodiment of the present invention;

DESCRIPTION OF THE PREFERRED EMBODIMENTS a. Aspects of the Invention

First, different aspects of the present invention are described with reference to the accompanying drawings.

Figure 1:
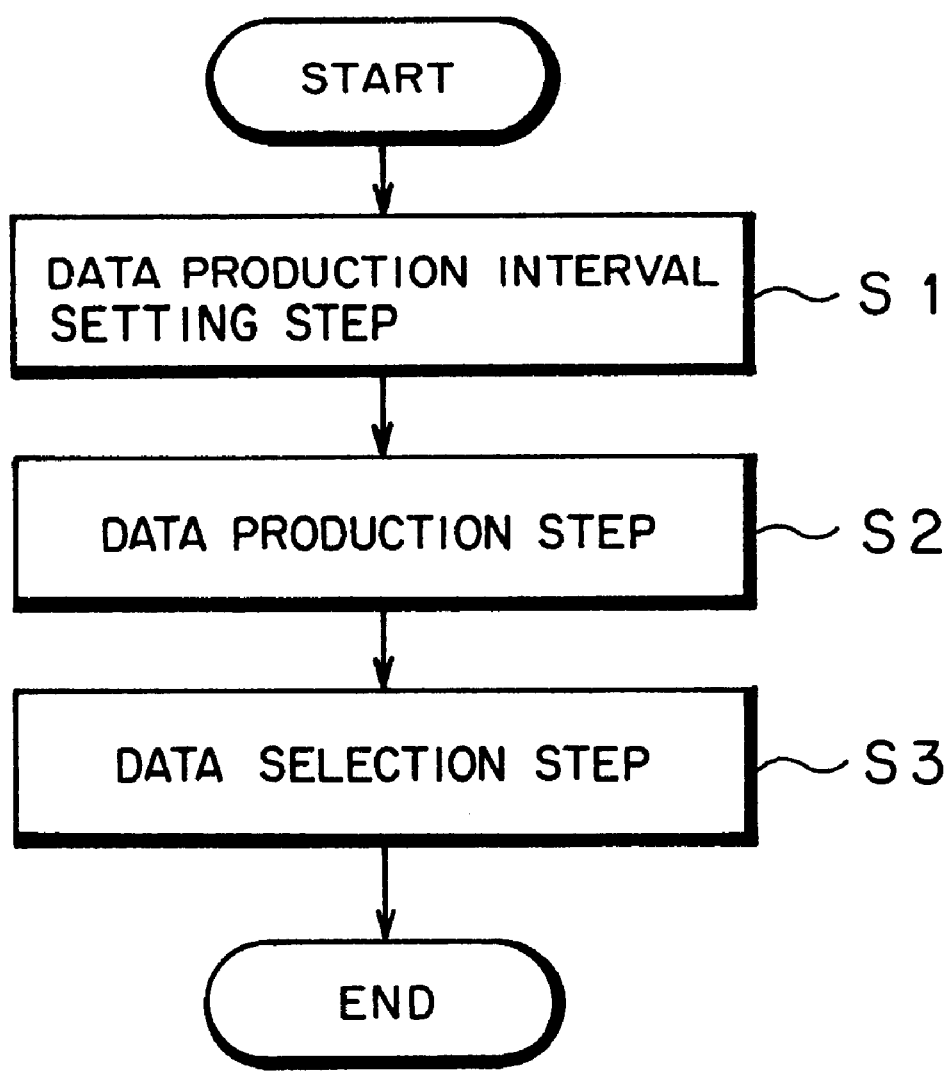
FIG. 1 is a flow chart illustrating an aspect of the present invention.

FIG. 1 illustrates in flow chart an aspect of the present invention. Referring to FIG. 1, the color conversion table construction conversion method of the present invention is constructed as a method of converting a construction of a color conversion table representing corresponding relationships of colors between a first color space and a second color space and includes the following processing steps.

In particular, in the data production interval setting step (step S1), data production intervals in a first color space are set based on a data dispersion in one of the first color space and a second color space, and in the data production step (step S2), the number of data representative of the corresponding relationships of colors is increased at the data production intervals obtained by the data production interval setting step (step S1).

Then, in the data selection step (step S3), some data are selected from either one or both of the data which originally construct the color conversion table and the data increased by the data production step (step S2).

With the color conversion table construction conversion method, since color data representative of corresponding relationships of colors between different color spaces are increased by interpolation based on a data dispersion (intervals in distribution) of originally existing color data and then only necessary data from among the increased data and the originally existing data are selected, a new color conversion table in which color data are distributed uniformly and which is effective to realize color conversion with a higher degree of accuracy can be produced efficiently at a high speed from necessary and least data.

Further, in the data production interval setting step (step S1) described above, data production intervals in the first color space may be set based on data intervals in the second color space corresponding to data intervals in the first color space.

With the color conversion table construction conversion method, since the data production intervals in the first color space are set based on the data intervals in the second color space corresponding to the data intervals in the first color space, data can be increased and distributed uniformly without causing data in the first color space to be one-sided and the coincidence degree to the data having a grid-like distribution in the first color space can be raised. Consequently, interpolation processing can be performed readily with the data.

Alternatively, in the data production interval setting step (step S1) described above, data production intervals in the first color space may be set based on data intervals in the first color space.

With the color conversion table construction conversion method, since the data production intervals in the first color space are set based on the data intervals in the first color space, the data production intervals can be set not based on any other space but based only on the first color space itself, and this can contribute to the flexibility in interpolation processing.

Figure 2:
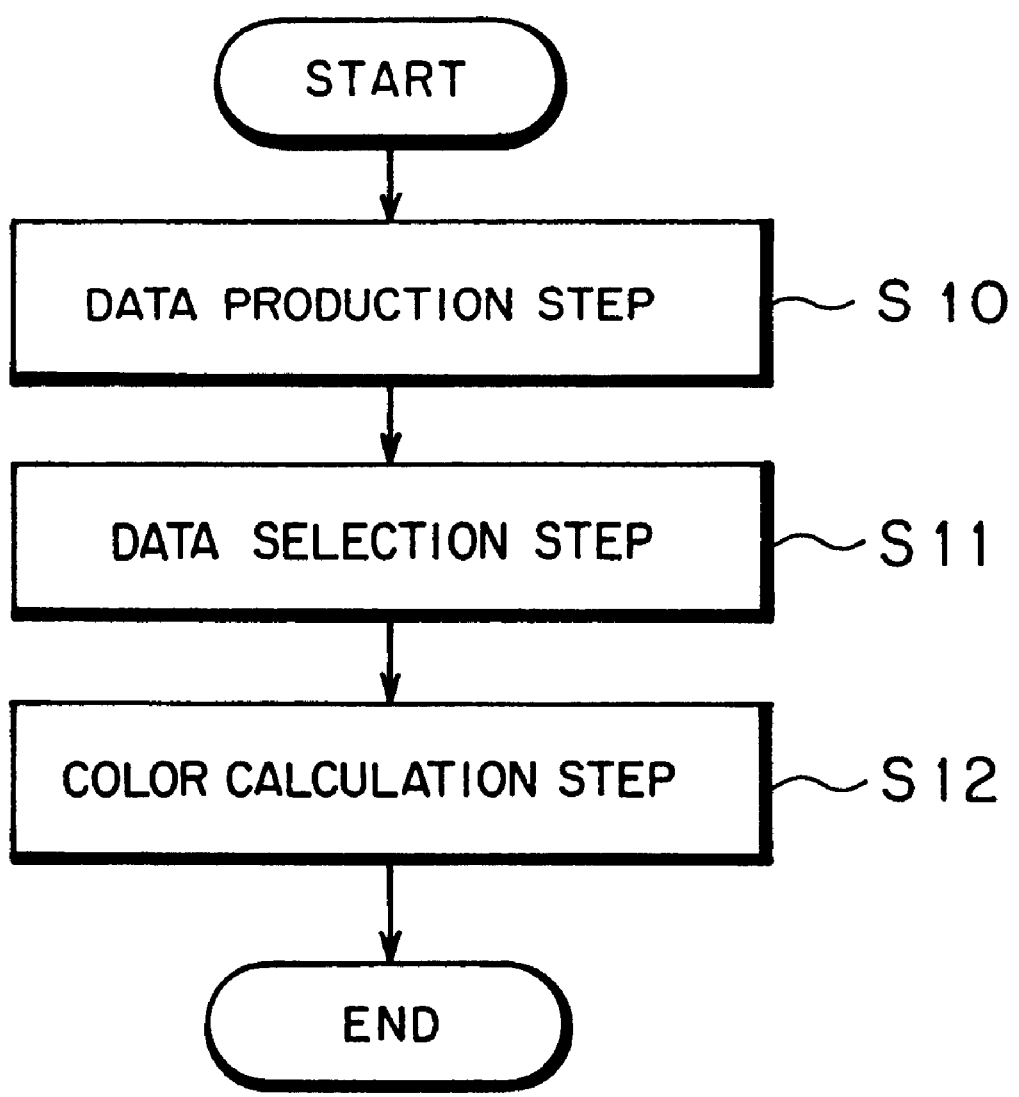
FIG. 2 is a flow chart illustrating another aspect of the present invention.

FIG. 2 illustrates in flow chart another principle of the present invention. Referring now to FIG. 2, in the color conversion table construction conversion method according to the second aspect of the present invention, the following process is performed.

In particular, in the data production step (step S10), corresponding relationships between colors in a second color space and coefficients necessary for production calculation of colors in a first color space corresponding to the colors in the second color space are produced to increase the number of data representative of the corresponding relationships of colors, and then, in the data selection step (step S11), some data are selected from either one or both of data which originally construct the color conversion table and the data increased by the data production step (step S10).

Then, in the color calculation step (step S12), regarding the data selected by the data selection step (step S11), colors in the first color space are calculated from the coefficients necessary for color production calculation in the first color space produced by the data production step (step S10).

With the color conversion table construction conversion method, since corresponding relationships between colors in a second color space and coefficients necessary for production calculation of colors in a first color space corresponding to the colors in the second color space are produced to increase the number of data representative of the corresponding relationships of colors and color production calculation processing can be performed only for color data which are necessary for interpolation, data calculation processing can be performed at a higher speed.

The first color space described above may be a color space of a color information inputting device.

With the color conversion table construction conversion method, where the first color space is a color space of a color information inputting device, whatever color space characteristics the color information inputting device has, a desired color conversion table can be produced rapidly.

Further, in the data selection step (step S3 or S11) described above, data present at or closely to regular positions in the second color space may be selected.

With each of the color conversion table construction conversion methods described above, since data present at or closely to regular positions in the second color space are selected, data of a new color conversion table can be arrayed regularly and can be used readily when color conversion of an image is performed.

Further, the data production step (step S2 or S10) may have the first data production step of increasing the number of data representative of the corresponding relationships of colors with a first data production interval and the second data production step of increasing the number of data representative of the corresponding relationships of colors with a second data production interval smaller than the first data production interval.

With each of the color conversion table construction conversion methods described above, since the number of data representative of the corresponding relationships of colors can be increased first with the first data production interval and then the number of data representative of the corresponding relationships of colors can be increased with the second data production interval smaller than the first data production interval, production of unnecessary data which are not selected in interpolation processing can be prevented, and a color conversion table can be produced efficiently.

Alternatively, in the data production step (step S2 or S10), data may be increased by weighted averaging calculation of two or more data.

With each of the color conversion table construction conversion methods described above, since data can be increased by weighted averaging calculation of two or more data, simple and high speed interpolation calculation processing can be performed.

Further, each of the color conversion table construction conversion methods described above may further comprise the close color detection step of detecting, from among colors set in advance, a color which is closest to each of colors in the second color space corresponding to the data which originally construct the color conversion table and the data increased by the data production step (step S2 or S10), the closeness degree calculation step of calculating a closeness degree of each of the close colors detected by the close color detection step, and the comparison step of comparing closeness degrees of other data for each of which a closeness degree has been calculated already and the closeness degree calculated by the closeness degree calculation step, the data selection step (step S3 or S11) being constructed so as to select data having a comparatively high closeness degree based on a result of the comparison by the comparison step.

In this instance, the color conversion table construction conversion method may further comprise the reference value comparison step of comparing the closeness degrees obtained by the closeness degree calculation step with a reference value, the data selection step (step S3 or S11) being constructed so as to select data having a comparatively high closeness degree from among those closeness degrees which have been detected to be lower than the reference value by the reference value comparison step.

With the color conversion table construction conversion method described above, since a color which is closest to each of colors in the second color space corresponding to the data which originally construct the color conversion table and the data increased by the data production step can be selected, only least and necessary data can be selected while interpolation calculation is being proceeded, and a color conversion table with a high degree of accuracy can be produced.

Further, each of the color conversion table construction conversion methods may further comprise the interval designation step in which a user designates data which define data production intervals in the data production step (step S2 or S10).

With the color conversion table construction conversion method described above, since data which designate data production intervals can be designated by a user, the user side can freely designate a required time for or a degree of accuracy in construction conversion.

On the other hand, a computer-readable recording medium according to a further aspect of the present invention has a color conversion table construction conversion program recorded thereon, which causes, in order to convert a construction of a color conversion table representative of corresponding relationships of colors between a first color space and a second color space, a computer to execute the data production interval setting procedure (refer to step S1 described hereinabove) for setting data production intervals in the first color space based on a data dispersion in one of the first color space and the second color space, the data production procedure (refer to step S2 described hereinabove) for increasing the number of data representative of the corresponding relationships of colors at the data production intervals obtained by the data production interval setting procedure (step S1), and the data selection procedure (refer to step S3 described hereinabove) for selecting some data from either one or both of the data which originally construct the color conversion table and the data increased by the data production procedure (step S2).

Further, a computer-readable recording medium according to a still further aspect of the present invention has a color conversion table construction conversion program recorded thereon, which causes, in order to convert a construction of a color conversion table representative of corresponding relationships of colors between a first color space and a second color space, a computer to execute the data production procedure (refer to step S10 described hereinabove) producing corresponding relationships between colors in the second color space and coefficients necessary for production calculation of colors in the first color space corresponding to the colors in the second color space to increase the number of data representative of the corresponding relationships of colors, the data selection procedure (refer to step S11 described hereinabove) for selecting some data from either one or both of the data which originally construct the color conversion table and the data increased by the data production procedure (step S10), and the color calculation procedure (refer to step S12 described hereinabove) for calculating, regarding the data selected by the data selection procedure (step S10), colors in the first color space from the coefficients necessary for color production calculation in the first color space produced by the data production procedure (step S11).

With each of the computer-readable recording media, since color conversion processing can be performed using the computer-readable recording medium on which the color conversion table construction conversion program is recorded, wide spreading of the conversion method of the present invention can be anticipated very much.

b. First Embodiment of the Invention

First, a color conversion table between color spaces which is used in a color space conversion apparatus to which a color conversion table construction conversion method according to the present invention is applied is described in detail.

Figure 3B:
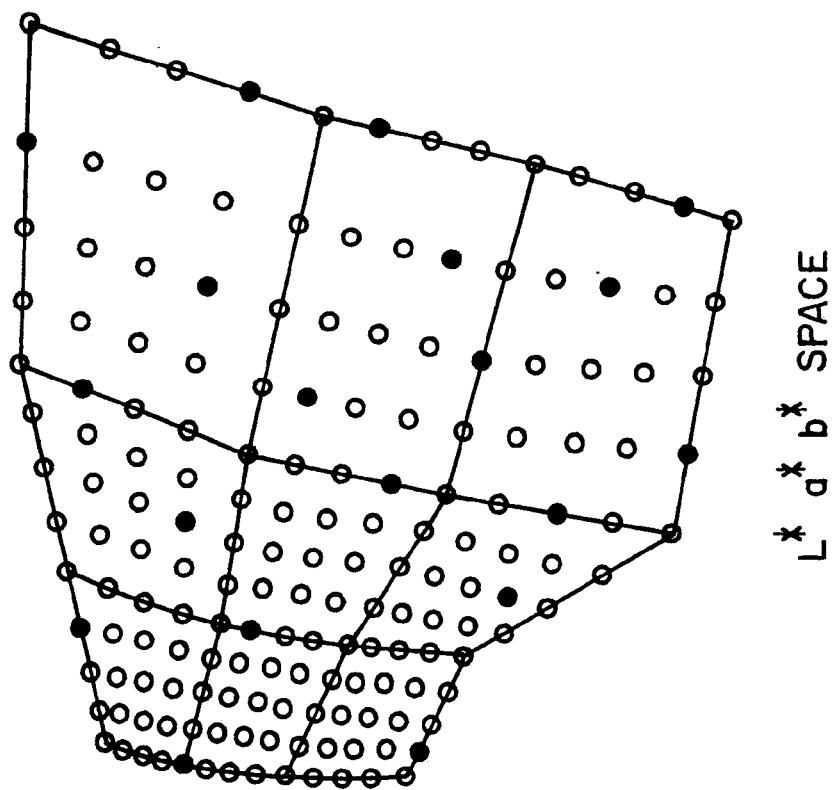
FIGS. 3(a) and 3(b) are diagrammatic views illustrating two different color spaces of a YMC space and an L*a*b* space to which a color conversion table construction conversion method of the present invention is applied, respectively.
Figure 3A:
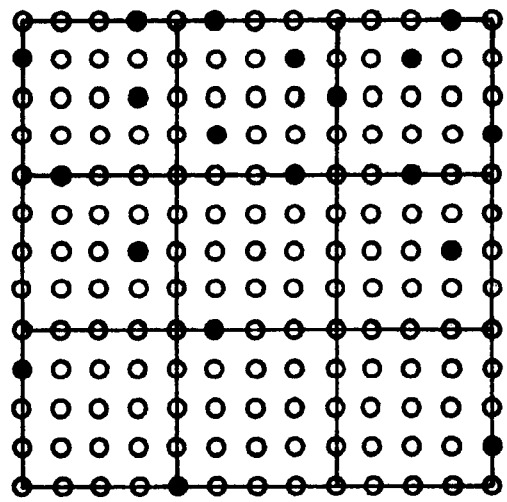

FIGS. 3(a) and 3(b) are diagrammatic views conceptionally illustrating corresponding relationships of colors between two different color spaces of a YMC space (first color space) and an L*a*b* space (second color space) two-dimensionally. Normally, such two different color spaces have corresponding relationships of approximately several hundreds colors.

Referring FIGS. 3(a) and 3(b), intersecting points (grid points) of solid lines in the two color spaces indicate corresponding relationships of originally existing colors, and data (indicated by "○" or "●") which are present at positions other than the grid points indicate new colors increased by interpolation. In the present embodiment, color data are increased by interpolation based on intervals of the originally existing color data in a distribution in the L*a*b* space using a table which represents corresponding relationships of representative values (here, color data on the grid points) or corresponding relationships between colors in the L*a*b* space and coefficients necessary for color production calculation in another color space (for example, the RGB space) corresponding to the colors in the L*a*b* space are produced as hereinafter described so that corresponding relationships between the two color spaces may be produced efficiently at a high speed and with a high degree of accuracy.

Figure 4:
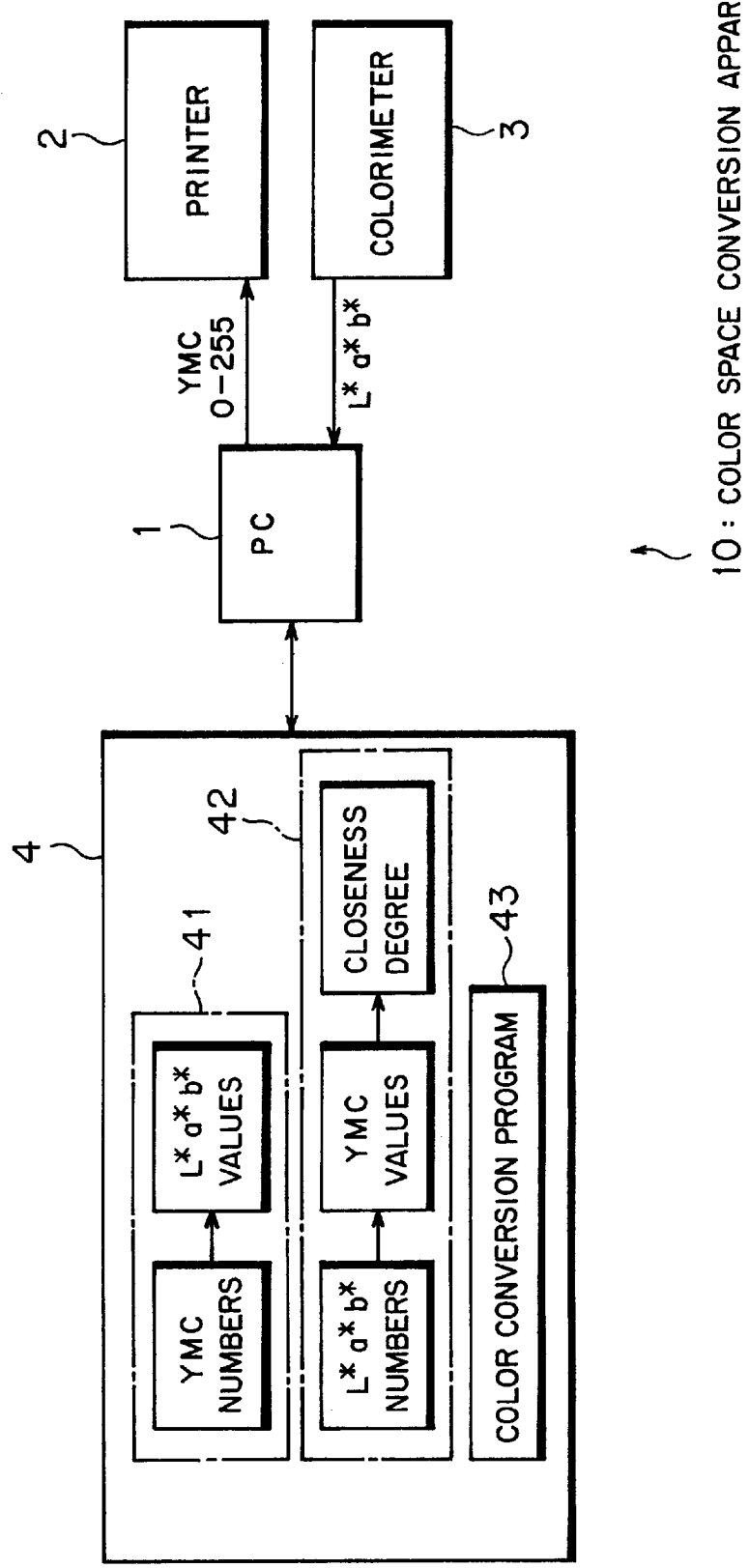
FIG. 4 is a block diagram showing a construction of a color space conversion apparatus to which a color conversion table construction conversion method according to a first preferred embodiment of the present invention is applied.

FIG. 4 shows in block diagram a construction of a color space conversion apparatus to which the color conversion table construction conversion method according to the first embodiment of the present invention is applied. Referring to FIG. 4, the color space conversion apparatus shown is generally denoted at color space conversion apparatus 10 and includes a computer (PC: personal computer) 1, a printer 2, a calorimeter 3 and a storage apparatus 4.

The printer 2 prints a color chart (patch printing). More particularly, the printer 2 can output color data (here, data of, for example, 256 gradations) corresponding to YMC data (YMC numbers) in the YMC space (first color space) outputted from the computer 1. In this instance, as a plurality of YMC numbers from within 0 to 255 are designated, a color chart is printed with colors individually corresponding to the YMC numbers.

The colorimeter 3 measures colors of a color chart printed by the printer 2. Consequently, color data (in the present embodiment, L*a*b* values) of a color space (second color space) of the device-independent type are obtained and outputted to the computer 1.

The storage apparatus 4 stores color conversion information of two different color spaces controlled by the computer 1 and stores, for example, a first color conversion table 41, a second color conversion table 42 and a color conversion program 43.

Figure 9:
FIG. 9 is a diagrammatic view illustrating an example of a first color conversion table used in the color conversion table construction conversion method of the first embodiment of the present invention.

The first color conversion table 41 stores YMC numbers inputted to the printer 2 and L*a*b* values obtained by measuring actual colors printed based on the YMC numbers by means of the calorimeter 3 and, for example, successively stores L*a*b* values using the YMC numbers as arguments as seen in FIG. 9. It is to be noted that the first color conversion table 41 is an original color conversion table before color conversion is performed.

Figure 5:
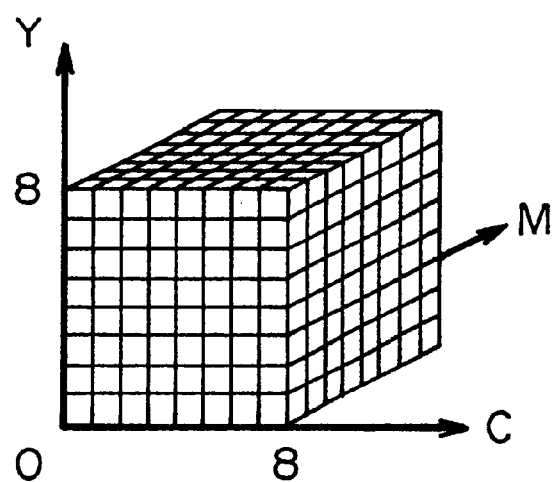
FIG. 5 is a diagrammatic view schematically illustrating an array of grid points in the YMC space used in the color conversion table construction conversion method of the first embodiment of the present invention.

By the way, in the present first embodiment, the first color conversion table 41 which has a grid-like distribution is formed, for example, in such a YMC space (space which includes 9×9×9 grid points) wherein the numbers of stages of Y values, M values and C values are all equal to 9 as schematically illustrated in FIG. 5. More particularly, this table 41 is constructed such that Y, M and C values are L*a*b* values individually labeled with numbers (YMC numbers) from 0 to 8.

Further, the grid-like color conversion table 41 formed in the YMC space can represent corresponding relationships between colors distributed like a grid and colors represented by L*a*b* values obtained from the colors, that is, corresponding relationships between YMC values and L*a*b* measurement values of a color chart outputted with the YMC values.

More particularly, a relationship between YMC numbers and YMC values described above is defined by the expression (1) given below. Accordingly, labeling with a number is possible. It is to be noted that "int" in the following expression (1) represents omission of fractions.

$$YMC \text{ values} = (int)(255.0 \times YMC \text{ numbers}/8.0+0.5) \quad (1)$$

In short, the printer 2 described above calculates (prints) YMC values based on the YMC numbers described above in accordance with the expression (1) given above.

Meanwhile, the second color conversion table 42 stores color data produced newly by interpolation processing, which will be hereinafter described, based on original color data prior to conversion registered in the first color conversion table 41 and is thus constructed as a new color conversion table. The second color conversion table 42 is produced by registration processing of new color conversion data based on the color conversion program 43 which will be hereinafter described.

Figures 6A, 6B:
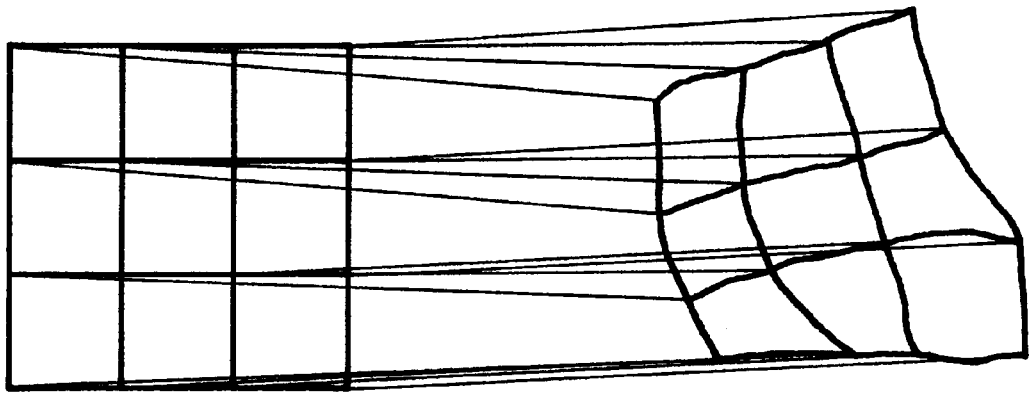
FIGS. 6(a) and 6(b) are diagrammatic views schematically and two-dimensionally illustrating corresponding relationships of colors between two color spaces of a YMC space and an L*a*b* space used in the color conversion table construction conversion method of the first embodiment of the present invention, respectively.

It is to be noted that, while the YMC values mentioned above are distributed like a grid in the YMC space (illustrated two-dimensionally in FIG. 6(a) for convenience of illustration) as schematically illustrated in FIG. 6(a), since the YMC space and the L*a*b* space do not have a linear relationship, they exhibit a distorted distribution in the L*a*b* space as schematically illustrated in FIG. 6(b).

For example, if the YMC values are distributed in such a manner as seen in FIG. 7(a) in the YMC space, then in the L*a*b* space, the YMC values are distributed in such a manner as seen in FIG. 7(b). It is to be noted that, in FIGS. 7(a) and 8(b), similarly as in FIGS. 3(a) and 3(b) mentioned hereinabove, intersecting points of solid lines indicate originally existing data while the other points indicate data produced newly as hereinafter described.

However, while the YMC space illustrated in FIG. 7(a) actually is a space which includes 9×9×9 grid points as described hereinabove with reference to FIG. 5. FIG. 7(a) illustrates a space, which includes 4×4×4 grid points, two dimensionally. Further, broken lines in FIG. 7(b) indicate grids in the L*a*b* space, and to calculate color data which correspond to grid points in the L*a*b* space by performing such interpolation calculation as hereinafter described based on the original color conversion table 41 and store (register) the color data into the storage apparatus 4 corresponds to production of the second color conversion table 42.

In short, here, the first color conversion table 41 constructed from color data at 9×9×9 grid points of the grid-like YMC space is converted into the second color conversion table 42 which is constructed from color data at grid points at intervals of 10 in the L*a*b* space. Here, however, the ranges of the L*a*b* values are set, for example, to $0 \leq L^* \leq 100$, $-100 \leq a^* \leq 100$ and $-100 \leq b^* \leq 100$, respectively, taking a color reproduction range of the printer 2 into consideration.

In the following, processing for converting the construction of the color conversion table 41 described above is described in detail with reference to FIGS. 8 to 12.

Figure 8:
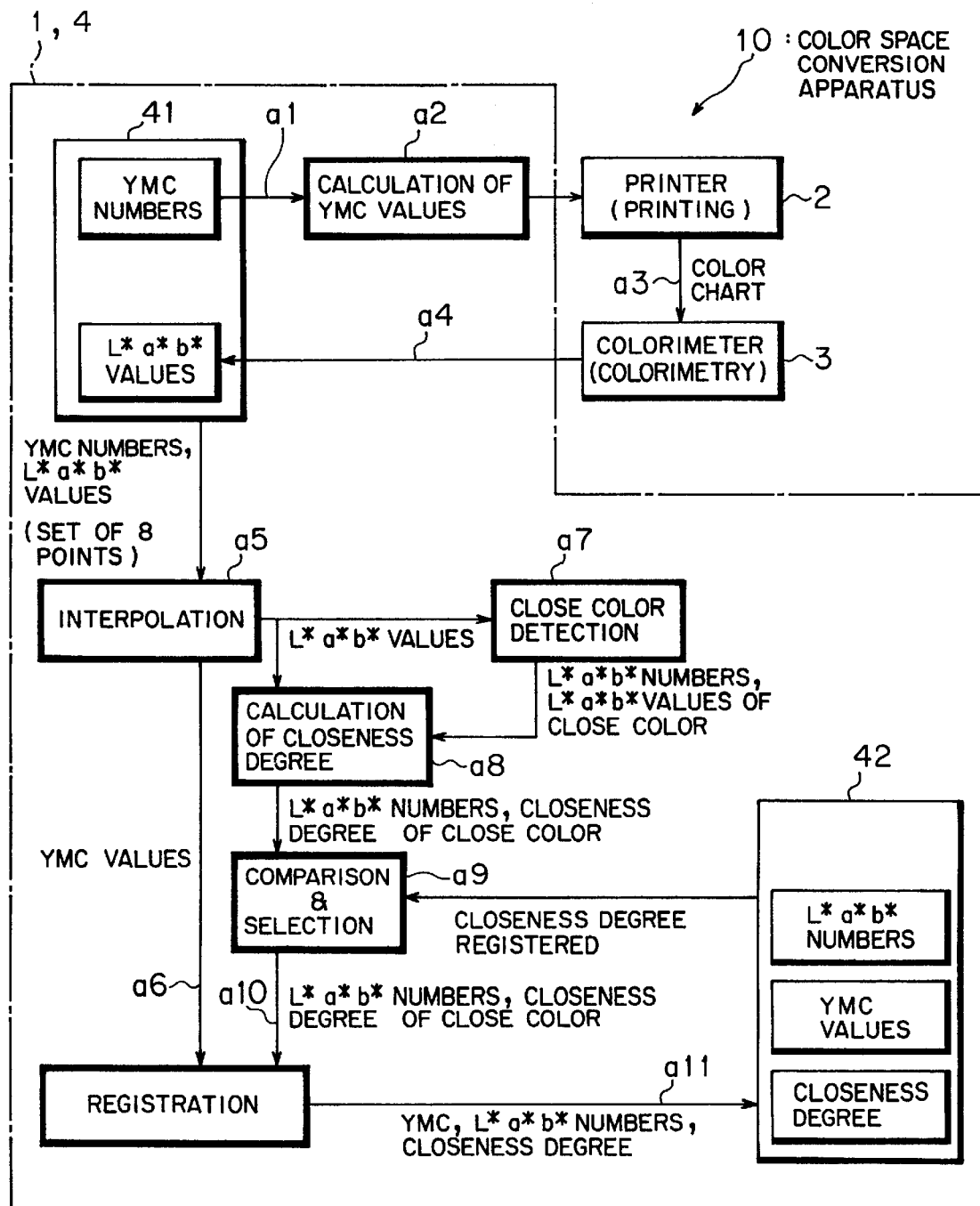
FIG. 8 is a diagrammatic view illustrating the color conversion table construction conversion method of the first embodiment of the present invention.

Referring first to FIG. 8, in the color space conversion apparatus 10, in order to produce the first color conversion table 41, the computer 1 calculates, based on YMC numbers (numbers of the 9×9×9 grid points) described above (step a1), YMC values and outputs the YMC values (Y=0 to 8, M=0 to 8 and C=0 to 8) to the printer 2 (step a2). Consequently, the printer 2 outputs colors corresponding to the inputted YMC values to print a color chart (step a3). Then, the color chart is measured (color measurement) by the calorimeter 3 so that L*a*b* values of the actually printed colors are measured. The L*a*b* values obtained are outputted to the computer 1. Consequently, the computer 1 records the YMC numbers and the L*a*b* values from the calorimeter 3 in a corresponding relationship into the storage apparatus 4 to produce the first color conversion table 41 (step a4).

More particularly, the first color conversion table 41 is produced, for example, as seen in FIG. 9, mapping the YMC numbers ((0, 0, 0), ..., (8, 8. 8)) which are numbers from 0 to 8 used for labeling of the YMC space and 9×9×9=729

L*a*b* values ((L*$_0$, a$_0$, b$_0$), . . . , (L$_{728}$, a$_{728}$, b$_{728}$)) in the maximum using the YMC numbers as arguments in the form of a three-dimensional array.

Thereafter, the computer 1 performs interpolation calculation processing based on the color data (YMC numbers and L*a*b* values) registered in the first color conversion table 41 (step a5). Here, preprocessing for preparation for the interpolation calculation processing is performed in the following manner.

Figure 11:
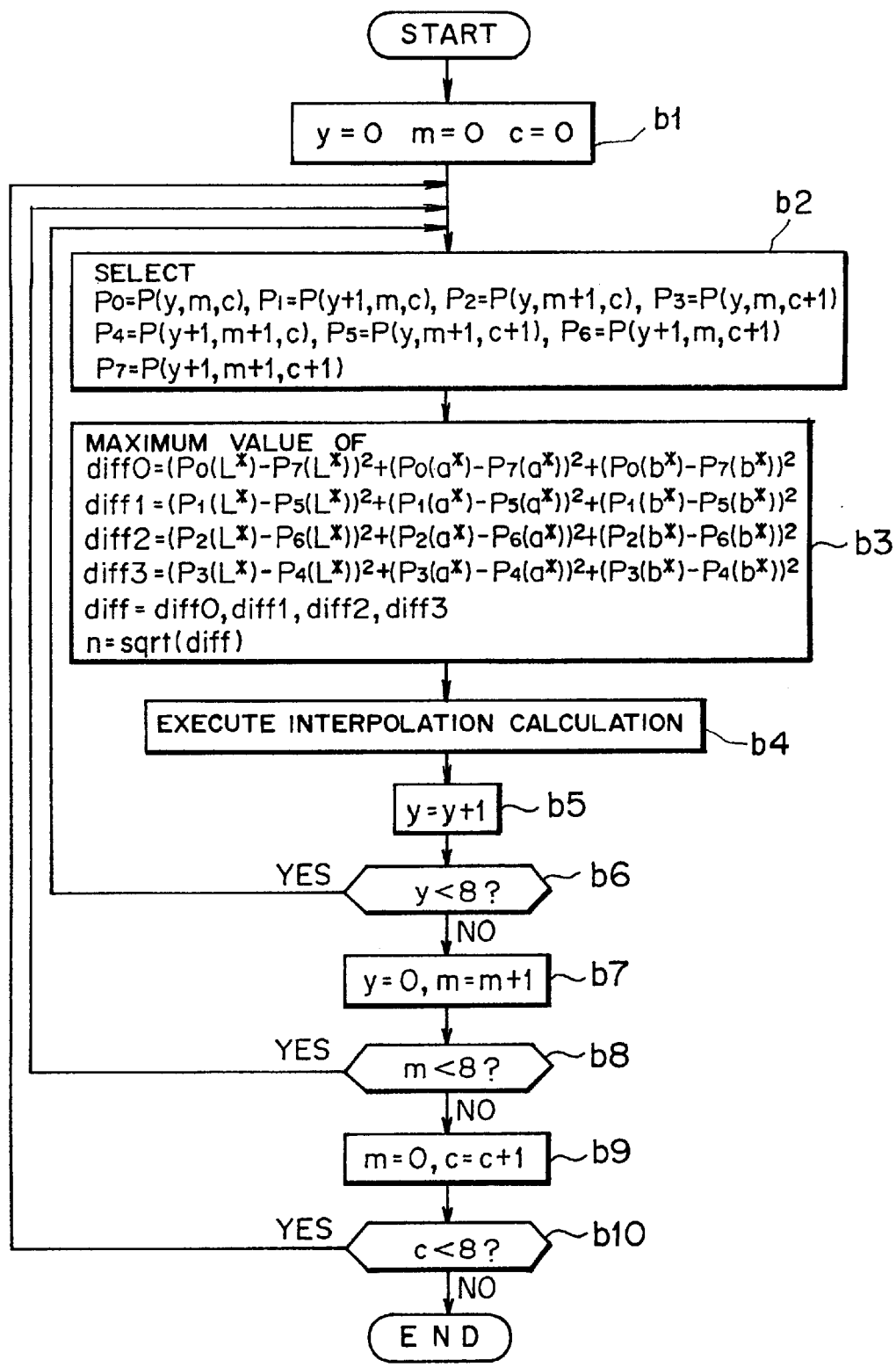
FIG. 11 is a flow chart illustrating the color conversion table construction conversion method of the first embodiment of the present invention.

Referring to FIG. 11, the computer 1 initializes the second color conversion table 42 first prior to conversion of a color space (y=0, m=0, c=0; step b1). In other words, the computer 1 sets the YMC values to "0" and a closeness degree (D) to "−1". It is to be noted here that the YMC numbers of an object of processing are represented by y, m and c, respectively. Further, since the closeness degree has a value equal to or higher than "0", if a closeness degree is registered once, then it has a value other than −1 and consequently can be utilized also as a flag for discrimination of whether or not a closeness degree is in registration.

Then, the computer 1 selects a set of data of 8 colors of the YMC space from among the data registered in the first color conversion table 41 (step b2). This corresponds to selection of a cube having colors (8 colors) at grid points described above with reference to FIG. 5. It is to be noted that the data of 8 colors selected here are represented as given as the following expressions (2) and individually correspond to the apexes of the selected cube.

$$P_0=P(y, m, c), P_1=P(y+1, m, c)$$
$$P_2=P(y, m+1, c), P_3=P(y, m, c+1)$$
$$P_4=P(y+1, m+1, c), P_5=P(y, m+1, c+1)$$
$$P_6=P(y+1, m, c+1), P_7=P(y+1, m+1, c+1) \quad (2)$$

where $P_x$ (x=0 to 7) represents a labeling number.

Thereafter, the computer 1 sets a data production interval for the YMC space based on a data dispersion in either one of the YMC space and the L*a*b* space (data production interval setting step). Here in the present first embodiment, the data production interval for the YMC space is set based on the data interval in the L*a*b* space corresponding to the data interval in the YMC space (step b3).

In other words, the computer 1 sets the interval between the intersecting points of the solid lines of the YMC space illustrated in FIG. 7(a) based on the interval between intersecting points of the solid lines of the L*a*b* values formed in the L*a*b* space illustrated in FIG. 7(b).

For example, since the distribution intervals of the intersecting points of the solid lines in the L*a*b* space are not uniform, that is, since the intersecting points of the solid lines in FIG. 7(b) exhibit a larger interval rightwardly, the coincidence degree of an L*a*b* value with a grid indicated by broken lines is lower on the right side than on the left side.

Therefore, in the present embodiment, the ratio at which the distance between intersecting points of solid lines is divided is set higher on the right side as seen in FIG. 7(a) by the data production interval setting described above so that the distances in distribution of points of L*a*b* values in the L*a*b* space may be uniform. In short, the ratio at which a cube (refer to arrow marks A, B and C in FIG. 7(a)) in the YMC space is to be divided, that is, the dividing number n of the individual sides of the cube, is varied in accordance with the distance in distribution of L*a*b* values in the L*a*b* space.

For example, if n is set to n=2 for the cube A, to n=3 for the cube B and to n=4 for the cube C, then the L*a*b* values are distributed substantially uniformly in the L*a*b* space (refer to arrow marks A', B' and C' in FIG. 7(b)).

It is to be noted that, if n is increased, then the quantity of calculation increases, and consequently, also the processing time increases. However, one of the processing time and the coincidence degree which should take precedence can be selected freely depending upon requirements of use by a user so that the number of colors to be produced by interpolation may be designated. In other words, data which define the data production intervals can be designated by a user (interval designation step). This allows a user to freely designate a required time or accuracy for construction conversion.

Subsequently, a method of determining the value of n mentioned above is described in detail. In particular, after selected data are determined in step b2 of FIG. 11, the value of n is determined by such calculation processing as given by the expressions (3) given below. More particularly, a square root value (the decimal part is discarded) of the highest value (diff) among square values (diff0 to diff3) of the distances between $P_0$ and $P_7$, $P_1$ and $P_5$, $P_2$ and $P_6$, and $P_3$ and $P_4$ in the L*a*b* space (the distances correspond to distances of diagonal lines of the cube) is used as n.

$$diff0=(P_0(L^*)-P_7(L^*))^2+(P_0(a^*)-P_7(a^*))^2+(P_0(b^*)-P_7(b^*))^2$$
$$diff1=(P_1(L^*)-P_5(L^*))^2+(P_1(a^*)-P_5(a^*))^2+(P_1(b^*)-P_5(b^*))^2$$
$$diff2=(P_2(L^*)-P_6(L^*))^2+(P_2(a^*)-P_5(a^*))^2+(P_2(b^*)-P_6(b^*))^2$$
$$diff3=(P_3(L^*)-P_4(L^*))^2+(P_3(a^*)-P_4(a^*))^2+(P_3(b^*)-P_4(b^*))^2$$

diff=highest value of diff0, diff1, diff2 and $$n=sqrt(diff) \quad (3)$$

where $P_x$ (L*) represent the L* values of the apexes of the cube, $P_x$ (a*) represent the a* values of the apexes, and $P_x$ (b*) represent the be values of the apexes (where x=0 to 7). In short, the computer 1 sets the division number n of the cube to a higher value as the distance between the apexes (grid points) $P_0$ to $P_7$ on the diagonal lines of the cube calculated in accordance with the expressions (3) given hereinabove in this manner increases so that data produced in the L*a*b* space may be distributed not irregularly but uniformly.

After the data production interval (division number n) for the selected cube is set in such a manner as described above, the computer 1 performs such interpolation calculation processing as hereinafter described (step a5 of FIG. 8 and step b4 of FIG. 11) to increase the number of data representative of corresponding relationships of colors with the data production interval obtained by the data production interval setting step described above (data production step).

Here, the interpolation calculation processing mentioned above (step b4 of FIG. 11) is described below with reference to FIGS. 8 and 12. In the present processing, a cube in the YMC space constructed from eight colors at grid points of the YMC is divided into n×n×n cubes, and color data corresponding to apexes of the cubes obtained by the division are produced by interpolation.

Figure 12:
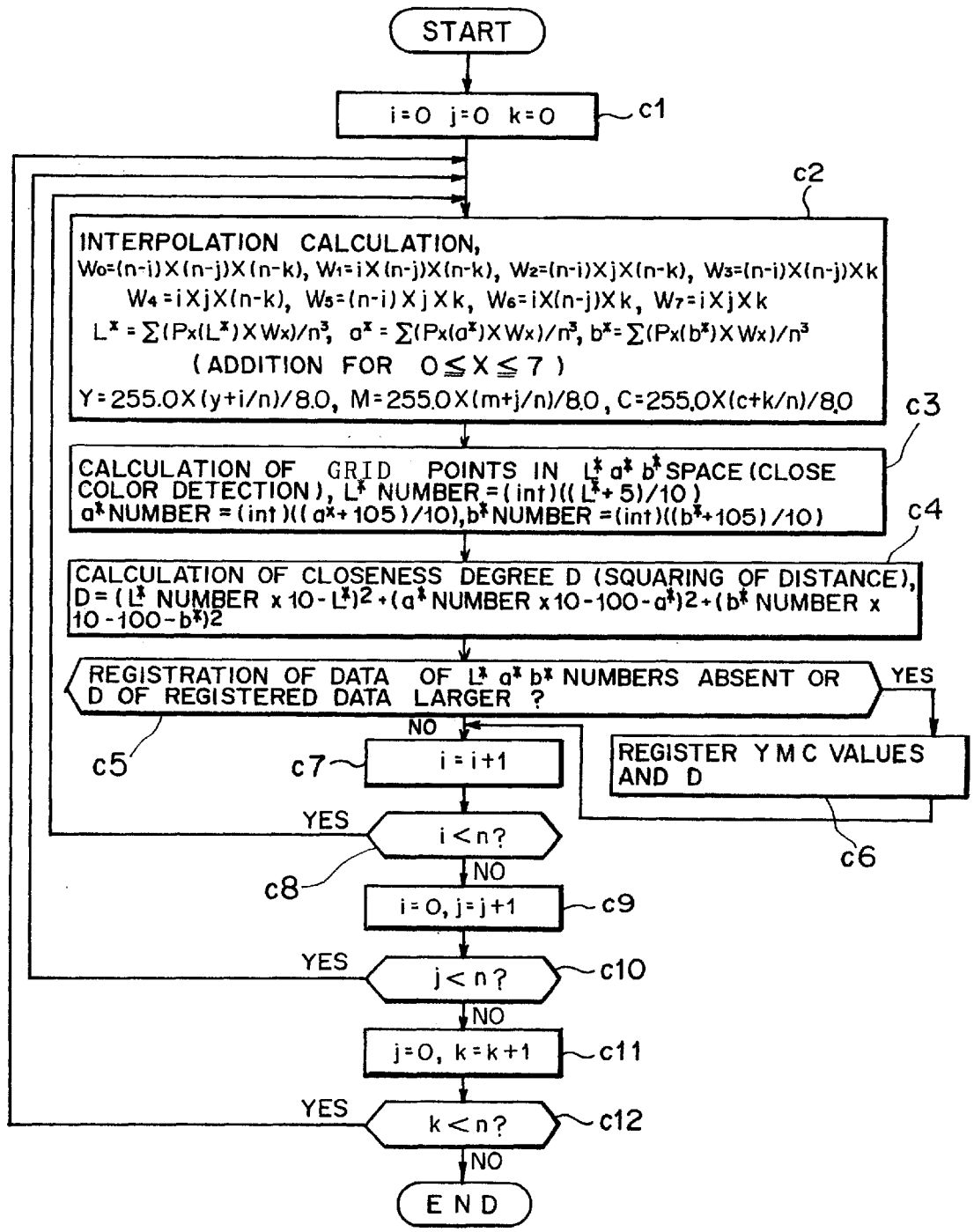
FIG. 12 is a flow chart illustrating the color conversion table construction conversion method of the first embodiment of the present invention.

It is to be noted that, in FIG. 12, "i", "j" and "k" are coefficients representative of a three dimensional space used upon interpolation processing, and where all of the coefficients are 0, this signifies that data in question are originally existing color data.

Referring to FIG. 12, the computer 1 first initializes the coefficients "i", "j" and "k" mentioned above (step c1) and then calculates new color data (L*a*b* values (refer to the expressions (5) given below) and YMC values (refer to the expressions (6) given below)) in accordance with the expressions (4) given below (step c2). It is to be noted that the color data obtained here correspond to "○" or "●" other than the grid points illustrated in FIGS. 7(a) and 7(b). In short, the L*a*b* values are values in the space illustrated in FIG. 7(b) while the YMC values are values in the space illustrated in FIG. 7(a).

$$W_0=(n-i) \times (n-j) \times (n-k)$$

$$W_1=i \times (n-j) \times (n-k)$$

$$W_2=(n-i) \times j \times (n-k)$$

$$W_3=(n-i) \times (n-j) \times k$$

$$W_4=i \times j \times (n-k),$$

$$W_5=(n-1) \times j \times k$$

$$W_6=i \times (n-j) \times k,$$

$$W_7=i \times j \times k \quad (4)$$

$$L^* = \Sigma(P_x(L^*) \times W_x)/n^3$$

$$a^* = \Sigma(P_x(a^*) \times W_x)/n^3$$

$$b^* = \sigma(P_x(b^*) \times W_x)/n^3 \quad (5)$$

where Σ represents addition (totalling) for $0 \leq x \leq 7$.

$$Y=255.0 \times (y+i/n)/8.0$$

$$M=255.0 \times (m+i/n)/8.0$$

$$C=255.0 \times (c+i/n)/8.0 \quad (6)$$

Thereafter, the computer 1 selects some data from either one or both of the data which originally construct the color conversion table 41 and the data increased by the data production step described above (data selection step). Here, for example, those data which are present at or closely to regular positions in the L*a*b* space. Particularly, the data selection step mentioned above is executed by a procedure described below.

First, as seen from FIG. 8, that one of predetermined colors which is closest to each of colors in the L*a*b* space corresponding to the color data which originally construct the color conversion table 41 and the color data increased by the data production step described above is detected (step a7; close color detection step).

In other words, the computer 1 detects, as seen from FIG. 12, a color (close color: "●") close to each intersecting point of broken lines (refer to FIG. 7(b)) of the L*a*b* space from the L*a*b* values obtained, and calculates a grid point (L*a*b* numbers) on the L*a*b* space from the close color in accordance with the following expressions (7) (step c3).

$$L^* \text{ number} = (\text{int})\{(L^*+5)/10\}$$

$$a^* \text{ number} = (\text{int})\{(a^*+105)/10\}$$

$$b^* \text{ number} = (\text{int})\{(b^*+105)/10\} \quad (7)$$

In short, in the present data selection step, from among the color data (points on the intersecting points of the solid lines) indicating corresponding relationships to the original YMC space illustrated in FIG. 7(a) and the new data (points other than the intersecting points of the solid lines) obtained by the interpolation, colors closest to the grid points of the grid-like L*a*b* space indicated by the broken lines in FIG. 7(a).

Consequently, data to be registered into the second color conversion table 42 can be arrayed regularly, and accordingly, color conversion of the image can be performed readily.

Thereafter, the computer 1 calculates a closeness degree (D) from the thus obtained close colors as seen in FIG. 8 (step a8; closeness degree calculation step). More particularly, the closeness degree is calculated by squaring the distance between color data produced by the interpolation calculation and color data at a grid point closest to the color data as seen from the following expression (8) (step c4 of FIG. 12). It is to be noted that, as the value calculated here decreases, the closeness degree increases.

$$D=(L^* \text{ number} \times 10 - L^*)^2 + (a^* \text{ number} \times 10 - 100 - a^*)^2 + (b^* \text{ number} \times 10 - 100 - b^*)^2 \quad (8)$$

Then, the computer 1 discriminates whether or not the YMC values in the YMC space corresponding to the L*a*b* numbers obtained as described above (step c3 of FIG. 12) are registered in the second color conversion table 42 (step c5). If the YMC values corresponding to the L*a*b* numbers are not registered, then the computer 1 registers the YMC values obtained by the interpolation calculation described hereinabove (refer to step a6 of FIG. 8 and step c2 of FIG. 12) into the second color conversion table 42 (from the YES route of step c5 to step c6, and steps a10 and all of FIG. 8).

On the other hand, if the YMC values corresponding to the L*a*b* numbers are registered already in the second color conversion table 42 (when the discrimination in step c5 of FIG. 12 is NO), then the computer 1 does not register the YMC values into the second color conversion table 42 but advances its processing to a next step.

Then, the computer 1 compares the closeness degree of the corresponding color data calculated already (registered in the second color conversion table 42) and the closeness degree obtained by the closeness degree calculation step with each other (step c5 of FIG. 12 and step a9 of FIG. 8; comparison step). Then, the computer 1 selects that data which exhibits a higher closeness degree (closer data) based on a result of the comparison (data selection step).

In other words, if the closeness degree registered in the second color conversion table 42 is lower than the closeness degree calculated newly, then the new closeness degree is selected and is overwritten into the pertaining area of and registered into the second color conversion table 42 (from the YES route of step c5 of FIG. 12 to step c6, and steps a10 and all of FIG. 8).

It is to be noted that, if the closeness degree calculated newly is equal to or lower than the closeness degree registered already (when the discrimination in step c5 of FIG. 12 is NO), updating of the closeness degree is not performed, but the processing advances directly to a next step.

Consequently, only least and necessary data can be selected while interpolation calculation is proceeded.

Thereafter, as seen from FIG. 12, interpolation calculation processing (data production processing) is successively performed based on the data distance (n) calculated in step b3 of FIG. 11 described hereinabove while the coefficients "i", "j" and "k" are individually and successively incremented for the three-dimensional directions (i, j, k) of the selected cube.

In particular, the computer 1 first increments i by one (step c7 of FIG. 12: i=i+1) and compares the value of i with n (step c8). If i is lower than n (YES in step c8), then the computer 1 performs such processing as interpolation calculation, detection of a close color, calculation of a closeness degree (D) and registration of the YMC values and the closeness degree (D) described hereinabove again.

Then, after the computer 1 repetitively performs such processing as described above while i is successively incremented until i reaches n, when it is discriminated that i is equal to or higher than n (NO in step c8), the computer 1 resets i to "0" and increments j by one (step c9: i=0, j=j+1).

Then, the computer 1 compares the value of j with n (step c10). If j is lower than n (YES in step c10), then the computer 1 performs the processing described above again based on the values of i, j and k then. Then, the computer 1 repetitively performs the processing described above while i is successively incremented until i reaches n with j kept in a fixed condition.

Thereafter, the computer 1 repetitively performs the processing described above while i and j are successively incremented. Then, when j becomes equal to or higher than n (when the discrimination in step c10 is NO), the computer 1 resets j to "0" and increments k by one (step c11: j=0, k=k+1).

Then, the computer 1 compares k and n with each other (step c12), and when the k is lower than n (when the discrimination in step C12 is YES), the computer 1 repetitively performs the processing described above while i and j are successively incremented in a procedure similar to that described hereinabove until k reaches n.

Thereafter, when k becomes equal to n (when the discrimination in step c12 is NO), since data of all of the L*a*b* numbers of the three-dimensional array have been produced, the interpolation calculation processing for the one cube is completed. It is to be noted that, in order to further increase the processing speed, when all of the coefficients (i, j, k) representing the three-dimensional space are "0", all of the processing described above with reference to FIG. 12 should not be performed but should be skipped.

After the interpolation calculation processing for the one cube is performed in such a manner as described above, the computer 1 successively performs such processing as interpolation processing, detection of a close color, calculation of a closeness degree and so forth described above with reference to FIG. 12 for all of the cubes in the YMC space while a cube in the YMC space is successively selected in regard to each of the YMC directions.

In particular, referring to FIG. 11, the computer 1 first increments a Y value (y) by one (step b5) and then discriminates whether or not y is smaller than "8" (step b6). If y is smaller than "8" (when the discrimination in step b6 is YES), the computer 1 successively selects a cube (apexes of the cube) corresponding to the y value then while y is successively incremented until y becomes equal to or higher than "8" (step b2). Thereafter, the computer 1 successively performs processing similar to the processing described above (interpolation processing and so forth) for the successively selected cubes. This corresponds, for example, to selection of eight cubes located on the Y axis in the YMC space shown in FIG. 5.

Thereafter, when the Y value becomes equal to or higher than "8" (when the discrimination in step b6 is NO), the computer 1 resets y to "0" and increments an M value (m) by one (step b7: y=0, m=m+1). Then, the computer 1 discriminates whether or not m is lower than "8" (step b8). and if m is lower than "8" (when the discrimination in step b8 is YES), then the computer 1 selects a cube (apexes of the cube) in the YMC space which corresponds to this m.

Then, while m is kept fixed, the computer 1 successively selects a cube corresponding to m and y then in a similar manner as described above while y, which has been reset as described above, is successively incremented. Then, when y becomes equal to or higher than "8". the computer 1 increments m and repetitively performs similar processing. As a result of the processing up to this stage. from among the cubes in the YMC space shown in FIG. 5, those 64 cubes which lie on the Y-M plane are selected.

Then, when the M value becomes equal to or higher than "8" (when the discrimination in step b8 is NO), the computer 1 resets m to "0" and increments a C value (c) by one (step b9: m=0, c=c+1). Then, the computer 1 discriminates whether or not c is lower than "8" (step b10). If c is lower than "8" (when the discrimination in step b10 is YES), then the computer 1 selects a cube which corresponds to y, m and c then.

Then, while c is kept fixed, the computer 1 successively performs selection processing of a cube while y and m, which have been reset as described above, are successively incremented in a similar manner as described above. Then, each time m becomes equal to or higher than "8", the computer 1 increments c and repetitively performs similar processing.

Thereafter, when c becomes equal to or higher than "8" (when the discrimination in step b10 is NO), all processing is completed. In short, in the processing described above, in the YMC space shown in FIG. 5, only y is incremented first to select eight cubes which lie on the C axis, and then y and m are successively incremented to select 64 cubes which lie on the C-Y plane, whereafter all of y, m and c are successively incremented to select cubes positioned in the direction of M with respect to the C-Y plane, thereby selecting all cubes (totalling 512 cubes) in the YMC space.

In this manner, by suitably selecting color data (a cube) of the YMC space and performing various processing for the color data such as interpolation processing, detection of a close color and so forth, color data (refer to "●" of FIGS. 7(a) and 7(b)) close to grid points in the L*a*b* space are selected from among original color data and color data produced newly, and corresponding relationships (second color conversion table 42) between the values of colors in the L*a*b* space and the values in the YMC space corresponding to the values in the L*a*b* space in such a form that only those color data close to the grid points are present in the L*a*b* space.

For example, since the ranges which may possibly be taken by the L*a*b* numbers described above are $0 \leq L*$ number $\leq 10$, $0 \leq a*$ number $\leq 20$ and $0 \leq b*$ number $\leq 20$ from the ranges of the L*a*b* values ($0 \leq L* \leq 100$, $-100 \leq a* \leq 100$, $-100 \leq b* \leq 100$) and the grid interval (10), 11×21×21=4,851 YMC values $\{(Y_0, M_0, C_0), \ldots, (Y_{4,850}, M_{4,850}, C_{4,850})\}$ and closeness degrees ($D_0, \ldots, D_{4,850}$) in the maximum produced by the processing described above are stored in the form of a three-dimensional array using the L*a*b* numbers $\{(0, 0, 0), \ldots, (10, 20, 20)\}$ as arguments as seen in FIG. 10.

It is to be noted that the relationships between the L*a*b* numbers and the L*a*b* values are given by the following expressions (9):

$L*$ value=$L*$ number×10

$a*$ value=$a*$ number×10−100

$b*$ value=$b*$ number×10−100     (9)

In short, since the second color conversion table 42 includes only those data which are close to grid points, a simple and easy interpolation method such as three line interpolation (eight point cube interpolation) can be used for actual color conversion of an image. Further, since a table of a construction which does not readily yield an error in color conversion of an image or a table which can be utilized readily in color conversion of an image can be constructed with a comparatively small amount of data, it is also possible to produce a color conversion table which has a high uniformity of color data, for example, by abandoning some of color data in a region in which the density of data is comparatively high while the remaining data are selected.

By the way, such production processing of a new color conversion table (second color conversion table 42) as described above is executed by a CPU (not shown) in the computer 1 (refer to FIG. 4) reading out the color conversion program 43 in the storage apparatus 4 and operating in accordance with the color conversion program 43. The color conversion program 43 is stored into the storage apparatus 4 by the computer 1 by installing a recording medium such as a floppy disk on which the color conversion program 43 is recorded into the storage apparatus 4.

In this manner, with the color space conversion apparatus 10 described above, since color data representative of corresponding relationships of colors between different color spaces are first increased by interpolation based on a dispersion (distance in distribution) of originally existing color data and only necessary data are selected from among the increased data and the originally existing data, a new color conversion table in which color data are distributed uniformly and realizes color conversion with a higher degree of accuracy can be produced efficiently at a high speed from least and necessary data.

It is to be noted that, in the data production processing described above, the following processing may be performed in regard to setting of the data production interval. In particular, it is possible to perform data production processing (first data production processing) for increasing the number of data representative of corresponding relationships of colors with a certain data production interval (first data production interval) first and then perform another data production processing (second data production processing) for increasing the number of data representative of corresponding relationships of colors with another data production interval (second data production interval) smaller than that in the first data production processing.

In other words, it is possible to first set the interval of data comparatively large to perform processing (perform processing with a comparatively small number of n) so as to limit the data to those in the proximity of particular colors (for example, colors whose data are actually registered by the processing performed with the increased interval) and then decrease the interval (increase n) to perform interpolation calculation and data registration processing into the second color conversion table 42 again.

Since a new color conversion table which does not have a high coincidence degree is produced and processing is performed again only for limited colors in the proximity of colors registered in the table in this manner, production of unnecessary data which will not be selected in interpolation processing can be prevented. It is to be noted that, for processing for colors in the proximity of particular colors, the ranges of the YMC values may be limited (the ranges need not be limited to $0 \leq y, m, c < 8$ and $0 \leq i, j, k < n$). Further, processing may be repeated while the value of n is successively increased.

Further, the computer 1 described above may compare, as a selection method of a closeness degree in the comparison processing (step c5 of FIG. 12), closeness degrees obtained and a predetermined reference value with each other and select data of those closeness degrees from among the closeness degrees lower than the reference value which are comparatively high (data selection processing).

Furthermore, the computer 1 can perform interpolation calculation processing by increasing data by weighted averaging calculation of two or more data. In other words, taking an influence of a plurality of data points into consideration, new data are calculated weighting data at the data points. In this instance, interpolation calculation processing can be performed more simply and at a higher speed.

Meanwhile, the calculation method of a closeness degree is not limited to that described above but may be defined by a distance or may be calculation of a sum of absolute values of differences between the coordinate systems. In this instance, however, while the accuracy is rather low comparing with that by such a calculation method wherein a closeness degree is calculated by squaring the distances as described above, either method can be applied depending upon the measurement condition and so forth.

Further, while, in the present embodiment, the YMC space which includes 9×9×9 grid points are converted into the L*a*b* space wherein the interval is 10, the interval of the L*a*b* space is not limited to 10 but may be set freely only if the L*a*b* space has a grid-like distribution.

c. Second Embodiment

While, in the first embodiment described above, a YMC space is used as the first color space while an L*a*b* space is used as the second color space to produce a color conversion table representative of corresponding relationships, in the present second embodiment, an RGB space is used as the first color space to produce a color conversion table representative of corresponding relationships.

In other words, here, a color conversion table representative of corresponding relationships is not converted into a color conversion table of a grid-like distribution in an L*a*b* space but into a color conversion table of a grid-like distribution in an RGB space. It is to be noted that, in the present embodiment, the RGB space is a color space of a color information inputting device.

Figure 13:
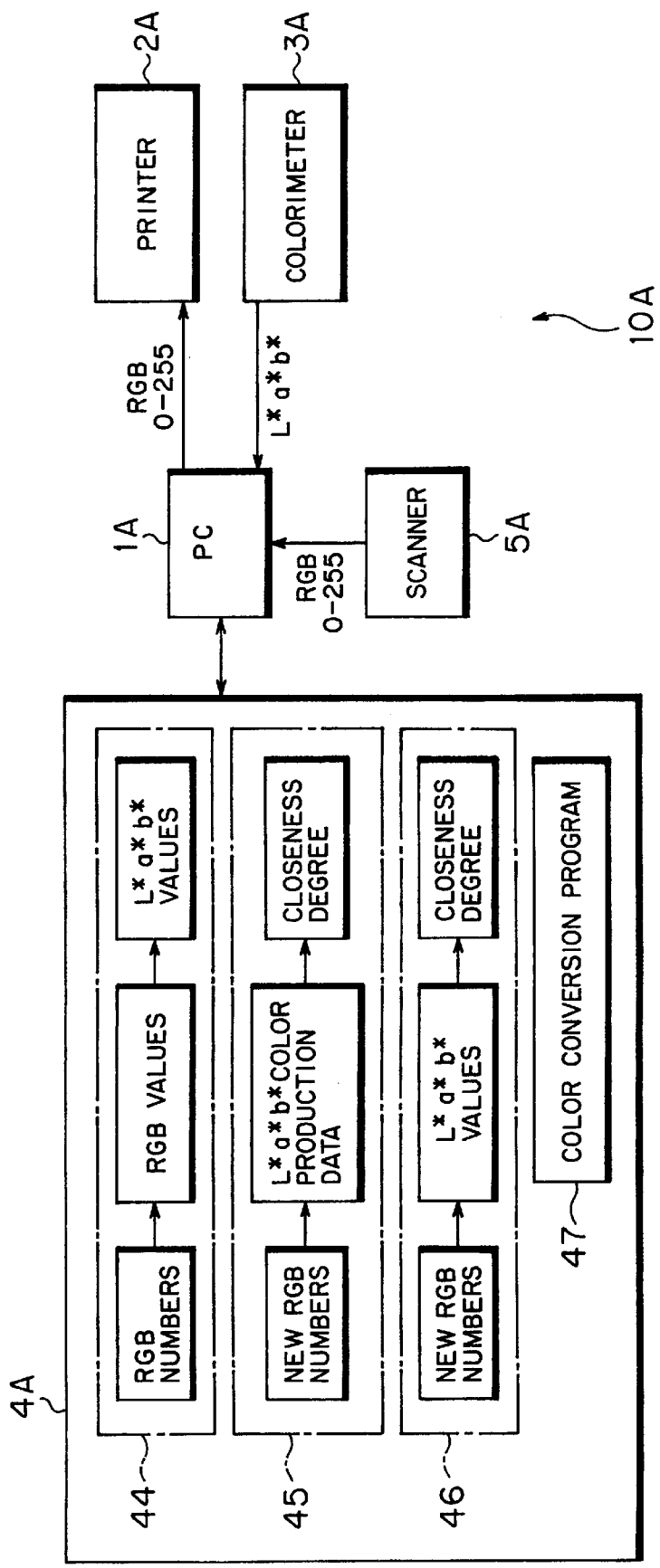
FIG. 13 is a block diagram showing a construction of a color space conversion apparatus to which a color conversion table construction conversion method according to a second preferred embodiment of the present invention is applied.

FIG. 13 shows in block diagram a construction of a color space conversion apparatus to which the color conversion table construction conversion method according to the second preferred embodiment of the present invention is applied. Referring to FIG. 13, the color space conversion apparatus is generally denoted at color space conversion apparatus 10A and includes a computer (PC: Personal Computer) 1A, a printer 2A, a colorimeter 3A. a storage apparatus 4A and a scanner 5A.

The printer 2A is provided to print a color chart (patch printing) inputted from the scanner 5A. In order to stabilize the color construction, a printer having a wide color reproduction range such as a printer of, for example, a silver salt photographing type is used for the printer 2A, and here, RGB data of 256 gradations can be inputted to the printer 2A. It is to be noted that an ordinary printer which can print a postscript has the function just described.

The calorimeter 3A measures colors of a color chart outputted from the printer 2A to obtain data (L*a*b* values) of a color space (second color space) of the device-independent type and outputs the data to the computer 1A. Meanwhile, the scanner 5A outputs RGB values obtained by scanning a color chart printed by the printer 2A to the computer 1A.

In this manner, in the second embodiment, a color chart having 9 stages of values for each of RGB is printed by the printer 2A and inputted to the scanner 5A so that RGB values corresponding to colors read by the scanner 5A are obtained. It is to be noted that the RGB values to be used here are calculated in accordance with the following expressions (10) similarly to YMC values in the first embodiment. However, also in this instance, the RGB numbers have integral values from 0 to 8.

$$\text{RGB values}=(\text{int})(255.0\times\text{RGB numbers}/8.0+0.5) \quad (10)$$

where "int" represents discarding of decimal parts.

Meanwhile, the storage apparatus 4A stores color conversion information of two different color spaces controlled by the computer 1A and includes, for example, a first color conversion table 44, a second color conversion table 45, a third color conversion table 46 and a color conversion program 47.

The first color conversion table 44 stores RGB values obtained by reading, by the scanner 5A, a color chart printed by the printer 2A and $L^*a^*b^*$ values measured by the colorimeter 3A in a corresponding relationship to each other and is constructed as an original color conversion table prior to color conversion.

While RGB values inputted to the printer 2A have a grid-like distribution, RGB values printed by the printer 2A and RGB values inputted from the scanner 5A by inputting a color chart which is a result of printing by the printer 2A are different from each other. In other words, even if it is tried to represent the same color space using an apparatus (for example, scanner 5A), since RGB values are different depending upon the characteristics of the apparatus, also the color space to be represented is different.

Therefore, the RGB values read by the scanner 5A do not exhibit a fully grid-like distribution. In other words, it is difficult to determine RGB values simply by calculation from RGB numbers like the expression (10) given hereinabove. Further, also $L^*a^*b^*$ values measured by the colorimeter 3A shown in FIG. 13 do not have a grid-like distribution since the $L^*a^*b^*$ space is a space of the device-independent type as described hereinabove in connection with the first embodiment. Those color spaces will be hereinafter described with reference to FIG. 14.

The second color conversion table 45 stores data representative of corresponding relationships to coefficients necessary for color production calculation for the $L^*a^*b^*$ space corresponding to colors in the RGB space and is constructed as an intermediate color conversion table.

The third color conversion table 46 stores color data ($L^*a^*b^*$ values) calculated as colors in the $L^*a^*b^*$ space from data registered in the second color conversion table 45 and is constructed as a new color conversion table. It is to be noted that registration processing of color conversion data into the second color conversion table 45 and the third color conversion table 46 is performed based on the color conversion program 47 which will be hereinafter described.

In other words, in the present second embodiment, an intermediate color conversion table (second color conversion table 45) is produced, and $L^*a^*b^*$ values are not registered directly into this table, but data representative of corresponding relationships to coefficients necessary for calculation of $L^*a^*b^*$ values are registered into the table while only selected least data ($L^*a^*b^*$ values) are stored into the third color conversion table 46.

By the way, in the relationship between the RGB space and the $L^*a^*b^*$ space described above, data are represented, for example, in such a manner as seen in FIGS. 14(*a*) and 14(*b*) based on RGB values inputted from the scanner 5A and $L^*a^*b^*$ values from the storage apparatus 4A, respectively. It is to be noted that intersecting points of solid lines in FIGS. 14(*a*) and 14(*b*) indicate originally present data while the other points indicate newly produced data similarly as in FIGS. 3(*a*) and 3(*b*) and FIGS. 7(*a*) and 7(*b*).

Further, a color conversion table constructed from 9×9×9 grid points in the RGB space is converted into a grid-like color conversion table whose interval is 15. It is to be noted that, also in this instance, while the spaces are actually spaces having 9×9×9 grid points, in FIGS. 14(*a*) and 14(*b*), spaces having 4×4×4 grid points are represented two-dimensionally as simplified forms of the actual spaces similarly as in the first embodiment described hereinabove.

Furthermore, broken lines in FIG. 14(*a*) represent grids in the RGB space, and to calculate coefficients necessary for calculation of color data corresponding to the grid points in the RGB space by performing such interpolation processing as hereinafter described based on the original color conversion table 44 and store the calculated coefficients into the storage apparatus 4A corresponds to production of the second color conversion table 45.

Consequently, numbers (RGB numbers) used for labeling a color chart (RGB values) printed by the printer 2A, RGB values read by the scanner 5A (intersecting points (grid points) of the solid lines in FIG. 14(*a*)) and intersecting points ($L^*a^*b^*$ values) of the solid lines in the $L^*a^*b^*$ space (FIG. 14(*b*)) corresponding to the RGB values read by the scanner 5A are registered into the first color conversion table 44 (refer to FIG. 13) described above.

Meanwhile, registered into the second color conversion table 45 described above are intersecting points (called new RGB numbers: grid-like distribution) of the broken lines in the RGB space shown in FIG. 14(*a*), data (necessary coefficients; they are referred to as $L^*a^*b^*$ color production data) for use for calculation of $L^*a^*b^*$ values and distances (closeness degrees) between colors ("●") close to intersecting points of the broken lines of the RGB space from among values obtained by interpolation processing which will be hereinafter described and the intersecting points of the broken lines.

On the other hand, new RGB numbers and $L^*a^*b^*$ closeness degrees registered in the second color conversion table 45 described above and $L^*a^*b^*$ values obtained from $L^*a^*b^*$ color production data are registered into the third color conversion table 46 described above.

In the following, processing of converting the construction of the color conversion table 44 described above is described in detail with reference to FIGS. 15 to 20.

Figure 15:
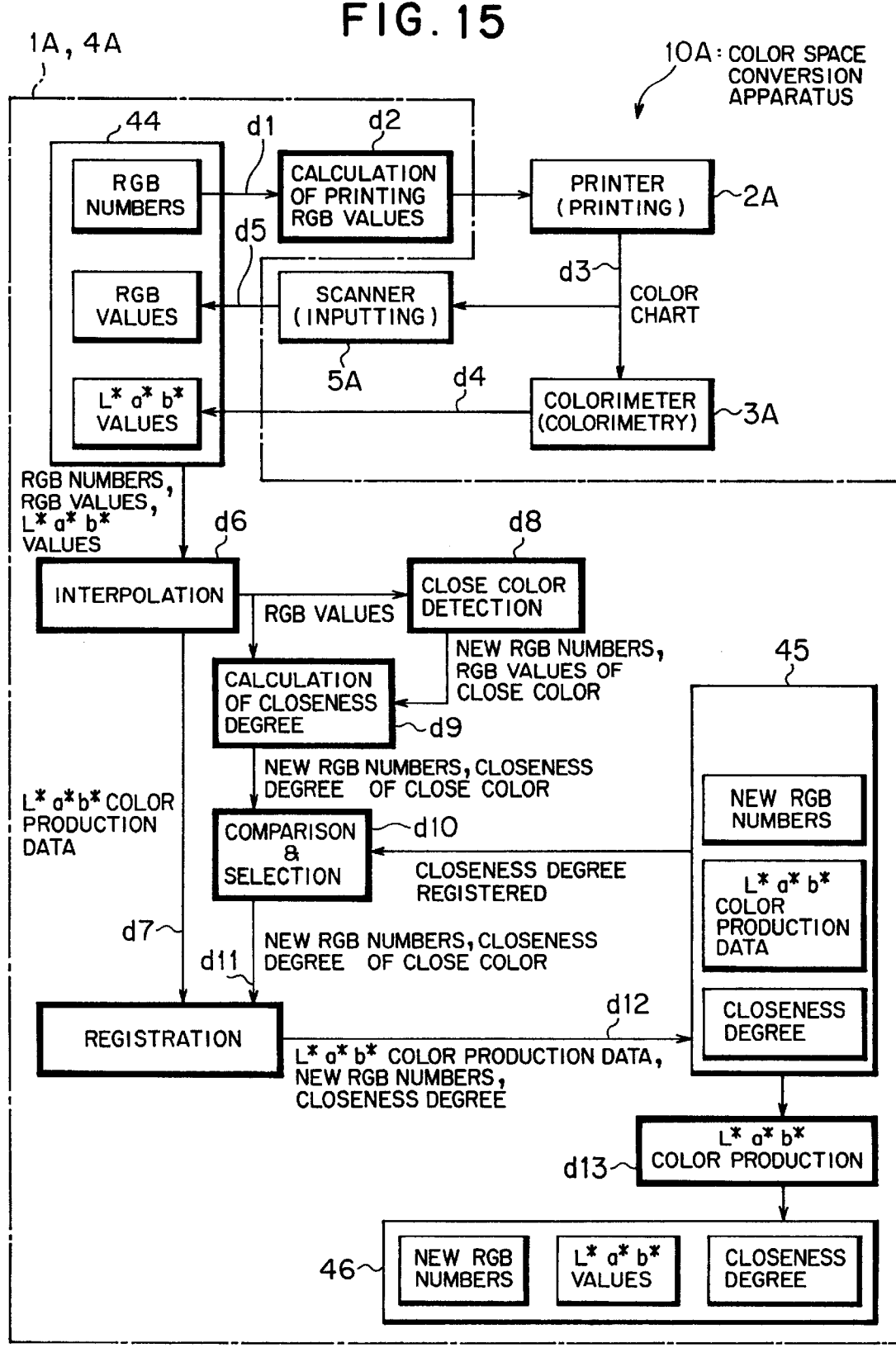
FIG. 15 is a block diagram illustrating the color conversion table construction conversion method of the second embodiment of the present invention.

Referring first to FIG. 15, in the color space conversion apparatus 10A, the computer 1A calculates, based on RGB numbers (step d1), RGB values (RGB values for printing) using the expressions (1) given hereinabove (step d2). Consequently, the printer 2A outputs colors corresponding to the RGB values inputted thereto to print a color chart (step d3). Then, the color chart is measured by the calorimeter 3A so that $L^*a^*b^*$ values of the actually printed colors are measured, and the resulting $L^*a^*b^*$ colors are outputted to the computer 1A (step d4). Simultaneously, the color chart printed by the printer 2A is read by the scanner 5A, and also the data (RGB values) read by the scanner 5A are outputted to the computer 1A (step d5).

Then, in the computer 1A, the RGB numbers described above, the $L^*a^*b^*$ values from the calorimeter 3A and the RGB values from the scanner 5A are recorded in a corresponding relationship into the storage apparatus 4A to produce a first color conversion table 44.

Figure 16:
FIG. 16 is a diagrammatic view illustrating an example of a first color conversion table used in the color conversion table construction conversion method of the second embodiment of the present invention.

More particularly, the first color conversion table 44 is produced such that, for example, as shown in FIG. 16, RGB numbers }(0, 0, 0), . . . , (8, 8, 8)} used for labeling with numbers from 0 to 8 in the RGB space, and RGB values $\{(R_0, G_0, B_0), \ldots, (R_{728}, G_{728}, B_{728})\}$ and L*a*b* values $\{(L_0, a_0, b_0, \ldots, (L_{728}, a_{728}, b_{728})\}$ for which the RGB numbers are used as arguments are mapped in the form of a three-dimensional array.

Then, the computer 1A performs interpolation calculation processing based on the color data stored in the first color conversion table 44 (step d6). In this instance, pre-processing for preparation for the interpolation calculation processing is performed in the following manner.

Figure 19:
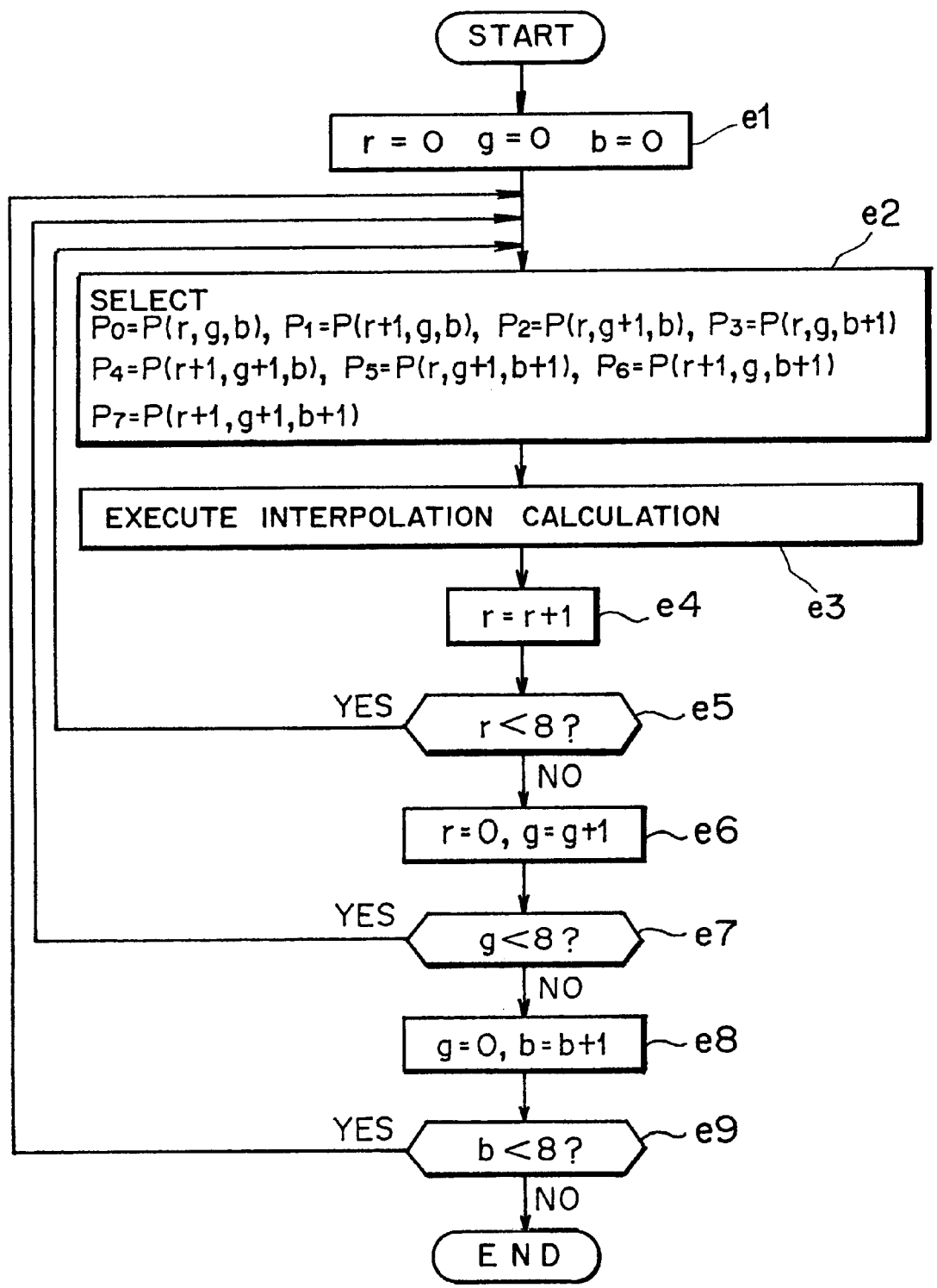
FIG. 19 is a flow chart illustrating the color conversion table construction conversion method of the second embodiment of the present invention.

Referring to FIG. 19, the computer 1A initializes the second color conversion table 45 prior to conversion of the color space (r=0, g=0, b=0; step e1). In other words, the RGB values are set to "0" and the closeness degree (D) is set to "−1". It is to be noted that, here, the RGB numbers of an object of processing are represented by r, g and b. The setting of the closeness degree can be utilized as a flag for discrimination of presence or absence of registration of a closeness degree similarly as in the first embodiment.

Then, the computer 1A selects a set of data of 8 colors in the RGB space as seen in FIG. 19 (step e2). Here, the data of 8 colors selected are represented as given by the following expressions (11):

$$P_0=P(r, g, b),$$
$$P_1=P(r+1, g, b)$$
$$P_2=P(r, g+1, b),$$
$$P_3=P(r, g, b+1)$$
$$P_4=P(r+1, g+1, b),$$
$$P_5=P(r, g+1, b+1)$$
$$P_6=P(r+1, g, b+1),$$
$$P_7=P(r+1, g+1, b+1) \quad (11)$$

where $P_x$ (x denotes an integer from 0 to 7) represents the labeling number in the RGB space.

It is to be noted that, since data of 8 colors to be selected are based on the RGB numbers outputted from the printer 2A, a complete cube is not formed by the data of 8 colors of the RGB space (a solid formed by such data is hereinafter referred to as hexahedron).

However, while the RGB values of the printer 2A and the RGB values of the scanner 5A are different in value from each other, since they do not have such a significant difference that the order of colors is different, if a hexahedron is selected in accordance with the order labeled with RGB numbers used when a color charge is outputted from the printer 2A, then the hexahedron has a shape near to a cube, and consequently, interpolation calculation processing can be performed in a procedure substantially similar to that in the first embodiment described hereinabove.

Further, in the second embodiment, colors which divide a hexahedron formed from 8 colors of the RGB into 4×4×4 hexahedrons are produced by interpolation. In other words, although, in the first embodiment described hereinabove, a cube is divided into n×n×n cubes and interpolation processing is performed for such cubes, in the present second embodiment, a hexahedron is divided into 4×4×4 (fixed value) hexahedrons and interpolation processing is performed for the hexahedrons.

Then, the computer 1A performs, as seen in FIG. 19, interpolation calculation processing based on the data selected in accordance with the expressions (11) given hereinabove (step e3). In other words, the computer 1A produces a relationship between the colors in the RGB space and coefficients necessary for color production calculation in the L*a*b* space corresponding to the colors in the RGB space to increase the number of data representative of corresponding relationships of colors described above (data production step).

In the following, a detailed procedure of the interpolation calculation processing is described in detail with reference to FIGS. 15 and 20. In the present processing, colors at apexes of hexahedrons obtained when a hexahedron in the RGB space formed by 8 colors at grid points of the RGB space is divided into 4×4×4 hexahedrons are produced by interpolation.

Referring to FIG. 20, the computer 1A first initializes the pertaining coefficients (step f1; i=0, i=0, k=0, n=4) and then calculates new color data (RGB values (refer to the following expressions (12)) in accordance with the expressions (4) given hereinabove (step f2). It is to be noted that the RGB values correspond to "○" or "●" other than the grid points shown in FIG. 14(a) described hereinabove.

$$R=\Sigma(P_x(R) \times W_x)/n^3$$
$$G=\Sigma(P_x(G) \times W_x)/n^3$$
$$B=\Sigma(P_x(B) \times W_x)/n^3 \quad (12)$$

where $\Sigma$ represents addition (totaling) for $0 \leq x \leq 7$.

Then, the computer 1A select some data from among the data which originally construct the first color conversion table 44 and the data increased by the data production step described above (data selection step). Here, for example, those data which are present at or closely to regular positions in the RGB space are selected. More particularly, the data selection step is executed in accordance with the following procedure.

First, the computer 1A detects, from among predetermined colors, those colors which are closest to colors in the RGB space which correspond to the color data which originally construct the color conversion table 44 and the color data increased by the data production step described above (step d8; close color detection step).

Figure 14B:
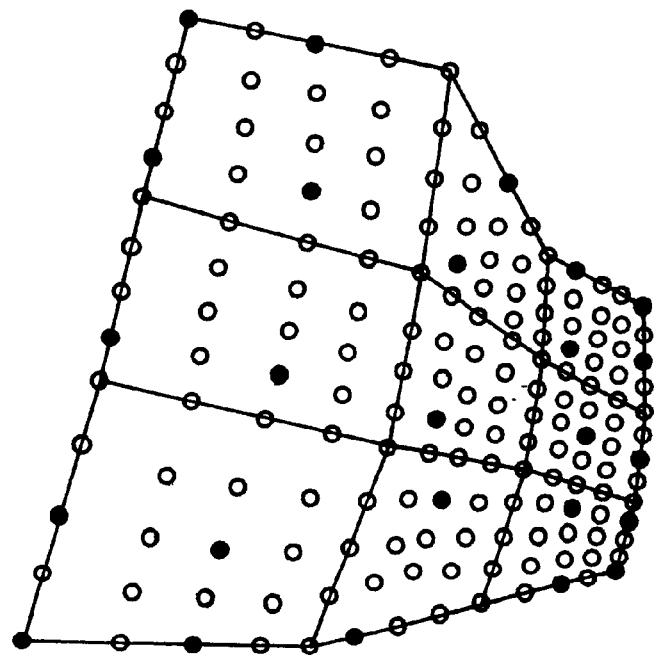
FIGS. 14(a) and 14(b) are diagrammatic views illustrating corresponding relationships of colors in two different color spaces of an RGB space and an L*a*b* space used in the color conversion table construction conversion method of the second embodiment of the present invention, respectively.
Figure 14A:
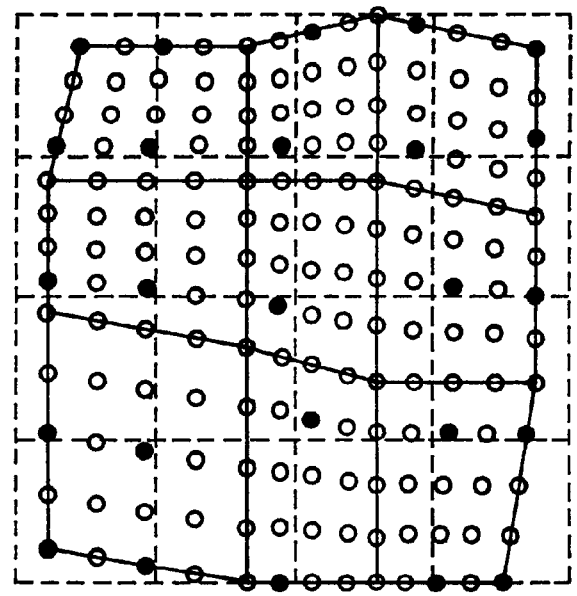

In other words, the computer 1A detects colors (close colors; "●") close to intersecting points of the broken lines of the RGB space from the RGB values obtained as seen in FIGS. 14(a) and 14(b), and calculates grid points (new RGB numbers) on the grid-like RGB space from the close colors in accordance with the following expressions (13) (step f3 of FIG. 20). It is to be noted that the new RGB numbers are set, where the grids are set at intervals of 15 in the RGB space of 0 to 255 (that is, 255/15=17 grids are set for each of the RGB directions), to $0 \leq R \leq 17$, $0 \leq G \leq 17$ and $0 \leq B \leq 17$, respectively.

$$\text{New R number}=(int)\{(R+7.5)/15\}$$
$$\text{New G number}=(int)\{(G+7.5)/15\}$$
$$\text{New B number}=(int)\{(B+7.5)/15\} \quad (13)$$

In short, in the RGB space described above with reference to FIG. 7(a), those of colors of the color data (grid points) representative of corresponding relationships to the original RGB space and the new data (points other than the grid points) obtained by the interpolation which are nearest to the grid points of the grid-like RGB space are detected.

Consequently, data to be recorded into the second color conversion table 45 can be arrayed regularly, and accordingly, color conversion of an image can be performed readily.

Thereafter, the computer 1A detects, from the close points obtained as described above, a closeness degree (D) as seen from FIG. 15 (step d9 of FIG. 15; closeness degree calculation step). More particularly, the closeness degree (D) is calculated by squaring the distance between color data produced by the interpolation calculation and the color data of a grid point nearest to the color data as seen from the following expression (14) (step f4). It is to be noted that the closeness degree increases as the value calculated here decreases.

$$D=(\text{new R number}\times 15-R)^2+(\text{new }G\text{ number}\times 15-G)^2+(\text{new }B\text{ number}\times 15-B)^2 \quad (14)$$

Thereafter, the computer 1A discriminates whether or not the coefficients (r, g, b, i, j. k) corresponding to the new RGB numbers obtained in such a manner as described above are registered in the second color conversion table 45 (step f5). If the coefficients corresponding to the new RGB numbers are not registered, then the computer 1A registers the corresponding coefficients into the second color conversion table 45 (from the YES route of step f5 of FIG. 20 to step f6, and refer to steps d7, d11 and d17 of FIG. 15).

Meanwhile, if the coefficients corresponding to the new RGB numbers are registered in the second color conversion table 45 (when the discrimination in step f5 of FIG. 20 is NO), the computer 1A does not register the coefficients corresponding to the new RGB numbers then into the second color conversion table 45.

Further, the computer 1A compares a closeness degree of corresponding color data for which the closeness degree has been calculated already and the closeness degree obtained by the closeness degree calculation step with each other (step f5 of FIG. 20, step d10 of FIG. 15; comparison step). Then, the computer 1A selects, based on a result of the comparison, color data which has a comparatively high closeness degree (color data closest to a grid point) (data selection step).

In particular, when the closeness degree registered already in the second color conversion table 45 is lower than the newly calculated closeness degree (when the discrimination in step f5 of FIG. 20 is YES), the new closeness degree is selected and is overwritten into the pertaining region of and registered into the second color conversion table 45 (step f6 of FIG. 20, steps d11 and d12 of FIG. 15).

However, when the newly calculated closeness degree is lower than the closeness degree registered in the second color conversion table 45 (when the discrimination in step f5 of FIG. 20 is NO), such updating of the closeness degree as described above is not performed. Consequently, only least and necessary data can be selected while interpolation calculation is proceeded in a similar manner as in the first embodiment.

After the processing described above is performed, interpolation calculation processing (data production processing: steps f7 to f12 of FIG. 20) for producing hexahedrons for all of the three-dimensional directions (i, j, k) is performed. It is to be noted that detailed description of this processing is omitted here since it is substantially similar to that in steps c7 to c12 of FIG. 12 described hereinabove in connection with the first embodiment.

Then, after such interpolation calculation processing for one hexahedron as described above is performed, the computer 1A performs interpolation calculation processing similarly for all of hexahedrons in the RGB space while the hexahedrons are successively Ad selected one by one for each of the directions of the RGB space.

In particular, the computer 1A first increments, as seen in FIG. 19, an R value (r) by one (step e4: r=r+1) and then discriminates whether or not the R value is lower than "8" (step e5). If the R value is lower than "8" (if the discrimination in step e5 is YES), then the computer 1A selects apexes of a hexahedron corresponding to the R value (step e2). Thereafter, the computer 1A repetitively performs similar processing to that described above while successively incrementing the R value until the R value reaches "8".

Thereafter, if the R value becomes equal to or higher than "8" (when the discrimination in step e5 is NO), the computer 1A resets the R value to "0" and increments a G value (g) by one (step e6; r=0, g=g+a). Then, the computer 1A discriminates whether or not the G value is lower than "8" (step e7). If the G value is lower than "8" (when the discrimination in step e7 is YES), the computer 1A selects apexes of a hexahedron corresponding to the G value. Then, while the G value is kept fixed, the computer 1A successively performs selection processing of a hexahedron described above while the R value is successively incremented until it reaches "8".

Then, the computer 1A repetitively performs similar processing to that described above while successively incrementing the G value one by one each time the R value reaches "8", and when the G value becomes equal to or higher than "8" (when the discrimination in step e7 is NO), the computer 1A resets the G value to "0" and increments a B value (b) by one (step e8: g=0, b=b+1).

Then, the computer 1A discriminates whether or not the B value is lower than "8" (step e9), and if the B value is lower than "8" (when the discrimination in step e9 is YES), then the computer 1A selects apexes of a hexahedron corresponding to the B value.

Then, also in this instance, while the B value is successively incremented, processing similar to that described above is repetitively performed, and if the B value becomes equal to or higher than "8" (when the discrimination in step e9 is NO), selection processing for all hexahedrons is completed.

By performing such processing as interpolation processing, detection of a close color and so forth for color data (hexahedrons) of the RGB space while color data (hexahedron) are suitably selected, color data (refer to "●" of FIG. 14) close to grid points in the RGB space are selected from among original color data and color data produced newly, and corresponding relationships (the second color conversion table 45) between values of colors in the RGB space and color production data of the values in the L*a*b* space can be produced in such a form that only those color data which are close to grid points are present in the RGB space.

Further, in the present second embodiment, since a hexahedron is divided into 4×4×4 hexahedrons, the number of times of calculation for a distance can be reduced remarkably comparing with that by an existing calculation method (9×9×9×4×4×4 (=729×64)), and consequently, high speed processing can be realized.

More particularly, as seen in FIG. 17. 18×18×18=5,832 sets of RGB numbers $\{(r_0, g_0, k_0, \ldots, r_{5,831}, g_{5,831}, b_{5,831})\}$, RGB interpolation coefficients $\{(i_0, j_0, k_0), \ldots, (i_{5,831}, J_{5,831}, k_{5,831})\}$ and closeness degrees $(d_0, \ldots, D_{5,831})$ in the maximum produced by the processing described above are stored in the form of a three-dimensional array using the new RGB numbers $\{(0, 0, 0, \ldots, (17, 17, 17)\}$ as arguments in the second color conversion table 45. It is to be noted that the RGB values of the first color conversion table 44 can be calculated simply by multiplying the new RGB numbers by 15.

The second color conversion table 45 is a table of a grid-like distribution (RGB grid points) in the color space of the scanner 5A. In short, while, in the first embodiment, YMC values are produced by interpolation using L*a*b* numbers as arguments for an array, in the present second embodiment, L*a*b* values are produced by interpolation using new RGB values as arguments of an array.

In this manner, a table of a construction which does not yield an error in color conversion of an image or a table which can be utilized readily for color conversion of an image can be constructed with a comparatively small amount of data.

After the computer 1A produces the second color conversion table 45 in this manner, the computer 1A calculates, as seen from FIG. 15, colors in the L*a*b* space from coefficients necessary for color production calculation in the L*a*b* space produced in the data production step based on the color data selected in the data selection step described above (step d13; color calculation step). More particularly, L*a*b* values are calculated in accordance with the expressions (5) given hereinabove to produce the third color conversion table 46.

The third color conversion table 46 stores, for example, 5,832 sets of L*a*b* values $\{(L_0, a_0, b_0), ., (L_{5,831}, a_{5,831}, b_{5,831})\}$ in the maximum in the form of a three-dimensional array using the new RGB numbers as arguments as seen in FIG. 18. It is to be noted that the new RGB numbers and the RGB closeness degrees registered in the third color conversion table 46 are similar to those registered in the second color conversion table 45 described hereinabove.

In this manner, the expressions for calculation of the L*a*b* values are more complicated than the expressions for calculation (refer to the expressions (1) given hereinabove) of the YMC values. In the second embodiment, since the L*a*b* values of the first color conversion table 44 as an original color conversion table do not have a grid-like distribution, with a color conversion table (first color conversion table 44) produced by measuring a color space of an inputting device such as the scanner 5A or a digital camera by means of the calorimeter 3A, it is difficult to produce a color chart wherein RGB values or L*a*b* values exhibit a regular grid-like distribution.

Therefore, by performing calculation of L*a*b* values by interpolation processing using only selected data as in the second embodiment, the number of times of color production calculation in the L*a*b* space can be reduced and the processing time required for interpolation calculation can be reduced remarkably.

In other words, while, in the first embodiment described above, both of L*a*b* values and YMC values are calculated by interpolation calculation (color production calculation), in the present second embodiment, an intermediate color conversion table is produced prior to production of a new color conversion table, and color production processing is performed only for RGB values, but calculation of L*a*b* values (mapping to the L*a*b* space) is not performed.

Therefore, RGB numbers (r, g, b) and interpolation coefficients (i. j, k) calculated from the printer 2A are registered into an intermediate color conversion table (second color conversion table 45), and L*a*b* values are calculated from those coefficients to produce a new color conversion table (third color conversion table 46). In short, in the present embodiment, it is not necessary to perform such calculation of YMC values (which correspond to L*a*b* values in the second embodiment) as in the first embodiment described above every time.

It is to be noted that, while it is described above that the second color conversion table 45 and the third color conversion table 46 are separate from each other, the L*a*b* values may otherwise be overwritten in a storage area for RGB numbers or a storage area for interpolation coefficients (i, j, k) of the second color conversion table 45. This eliminates the necessity for assurance of such a separate storage area as the third color conversion table 46.

By the way, such production processing of the color conversion tables (second color conversion table 45 and third color conversion table 46) as described above is executed as the CPU (not shown) in the computer 1A (refer to FIG. 13) reads out the color conversion program 47 in the storage apparatus 4A and operates in accordance with the color conversion program 47. The color conversion program 47 is stored into the storage apparatus 4A by the computer 1A by installing a recording medium such as a floppy disk on which the color conversion program 47 is recorded into the computer 1A.

With the color space conversion apparatus 10A described above, since corresponding relationships between colors in an L*a*b* space and coefficients necessary for color production calculation in an RGB space corresponding to the colors in the L*a*b* space can be produced to increase the number of data representative of corresponding relationships of colors and color production calculation processing (calculation of L*a*b* values) can be performed only for necessary color data to be produced by interpolation in this manner, the speed of data calculation processing can be further increased.

It is to be noted that the computer 1A described above may select a closeness degree in the comparison processing (step f5 of FIG. 20) alternatively by comparing closeness degrees obtained and a reference value with each other similarly as in the first embodiment (reference value comparison step). In this instance, from among closeness degrees lower than the reference value, data having a comparatively high closeness degree can be selected (data selection step).

Further, the computer 1A may perform interpolation calculation processing by increasing data by weighted averaging calculation of two or more data. In other words, taking an influence of a plurality of data points into consideration, the data at the data points are weighted to obtain other data. This allows simple interpolation calculation processing to be performed at a high speed. Further, the calculation method for a closeness degree is not limited to that described hereinabove in connection with the first embodiment.

Further, while the data production intervals are fixed to "4" here, as described hereinabove in connection with the first embodiment, it is possible to first perform data production processing (first data production processing) for increasing the number of data representative of corresponding relationships of colors at certain data production intervals (first data production intervals) and then perform data production processing (second data production processing) for increasing the number of data representative of corresponding relationships of colors at data production intervals (second data production intervals) smaller than the first-mentioned data production intervals. Furthermore, the data production intervals (division numbers) are not limited to 4 but may be varied suitably depending upon conditions only if they are fixed values.

Further, while an RGB space having 9×9×9 grid points is converted into an RGB space of the intervals of 15, the intervals are not limited to 15 but may be set freely if the space has a grid-like distribution.

d. Third Embodiment

Figure 21:
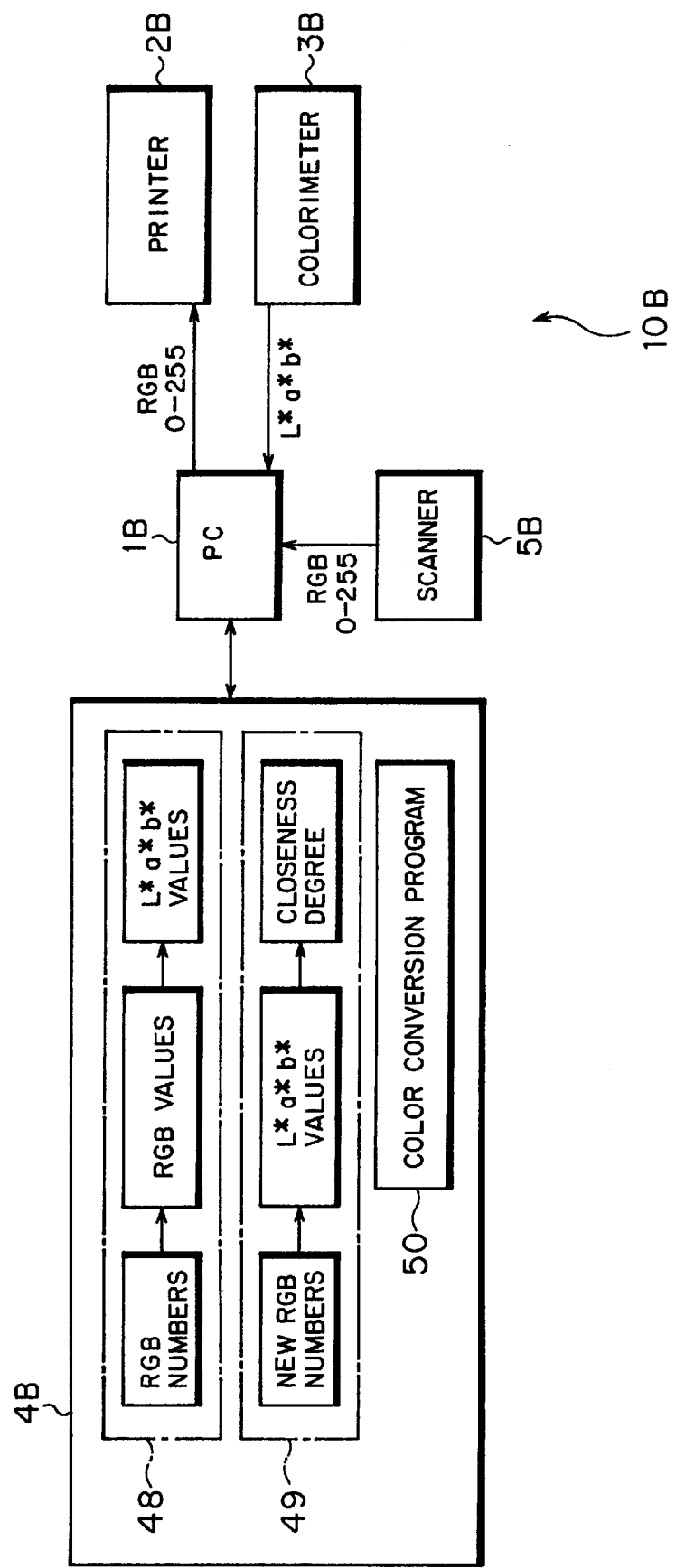
FIG. 21 is a block diagram showing a construction of a color space conversion apparatus to which a color conversion table construction conversion method according to a third preferred embodiment of the present invention is applied.

While, in the second embodiment described above, an RGB space is used as the first color space while an L*a*b* space is used as the second color space and L*a*b* values in the RGB space are calculated and particularly L*a*b* values are calculated only with selected data by producing an intermediate color conversion table (refer to FIG. 13), in the third embodiment, interpolation calculation processing is performed between two different color spaces similar to those of the second embodiment without producing an intermediate color conversion table in a similar manner as in the first embodiment described hereinabove., FIG. 21 shows in block diagram a construction of a color space conversion apparatus to which the color conversion table construction conversion method according to the third embodiment of the present invention is applied. Referring to FIG. 21. the color space conversion apparatus is generally denoted at 10B and includes a computer (PC: Personal Computer) 1B, a printer 2B, a calorimeter 3B, a storage apparatus 4B and a scanner 5B.

It is to be noted that the computer 1B, printer 2B, calorimeter 3B and scanner 5B shown in FIG. 21 are similar to the computer 1A, printer 2A, colorimeter 3A and scanner 5A (refer to FIG. 13) described hereinabove in connection with the second embodiment, respectively.

The storage apparatus 4B stores color conversion information of two different color spaces controlled by the computer 1B and includes, for example, a first color conversion table 48, a second color conversion table 49 and a color conversion program 50. The first color conversion table 48 is similar to the first color conversion table 44 described hereinabove in connection with the second embodiment and stores RGB numbers, RGB values and L*a*b* values.

The second color conversion table 49 is substantially similar to the third color conversion table 46 in the second embodiment, but is produced by a different procedure from that of the third color conversion table 46.

Figure 22:
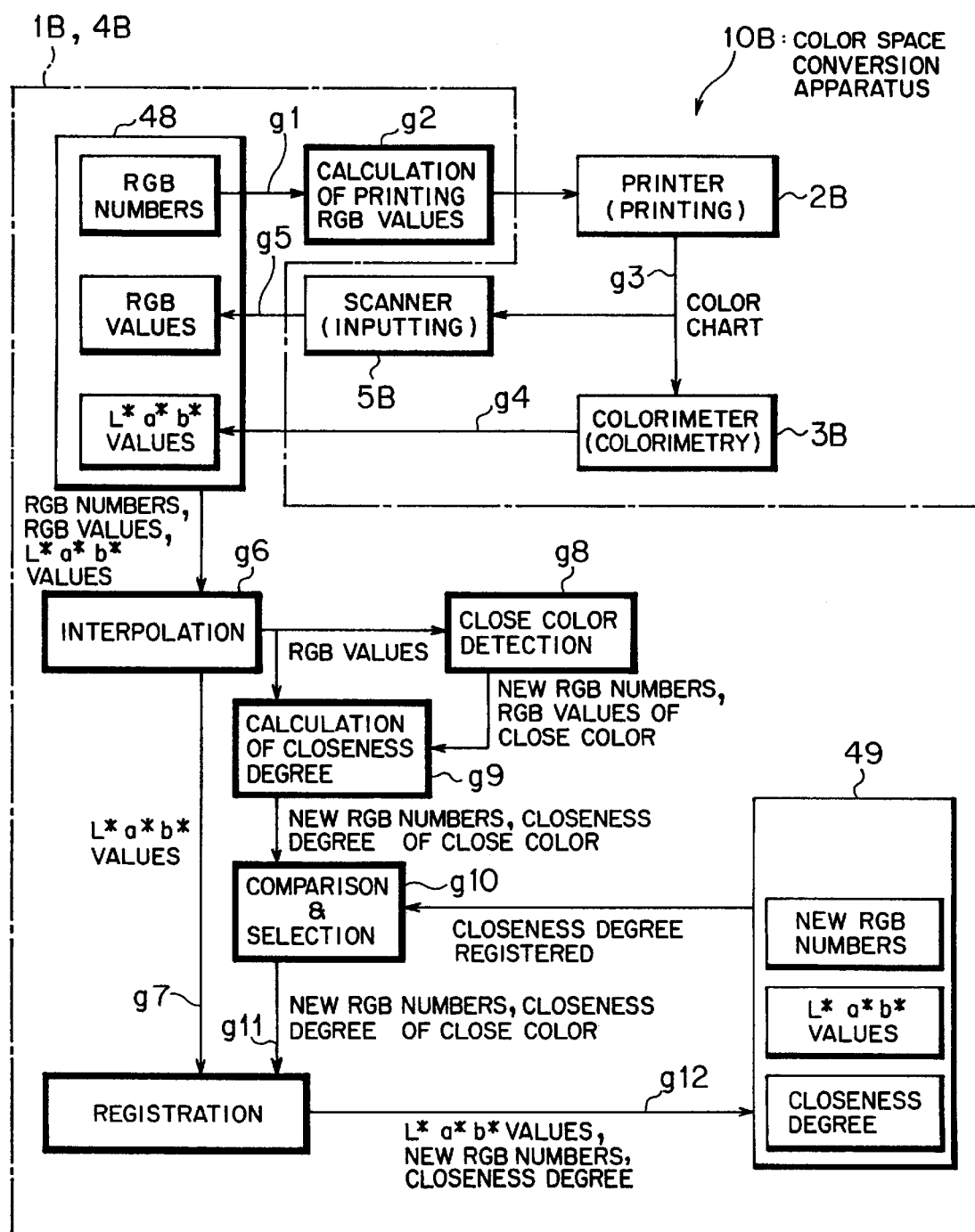
FIG. 22 is a block diagram illustrating the color conversion table construction conversion method of the third embodiment of the present invention.

In the following, the production procedure of the second color conversion table 49 is described with reference to FIGS. 22 to 24. It is to be noted that, since processing in steps g1 to g5 illustrated in FIG. 22 and processing in steps h1 and h2 illustrated in FIG. 23 are similar to those in steps d1 to d5 illustrated in FIG. 15 and in steps e1 and e2 illustrated in FIG. 19, respectively, overlapping description of them is omitted here to avoid redundancy.

Figure 23:
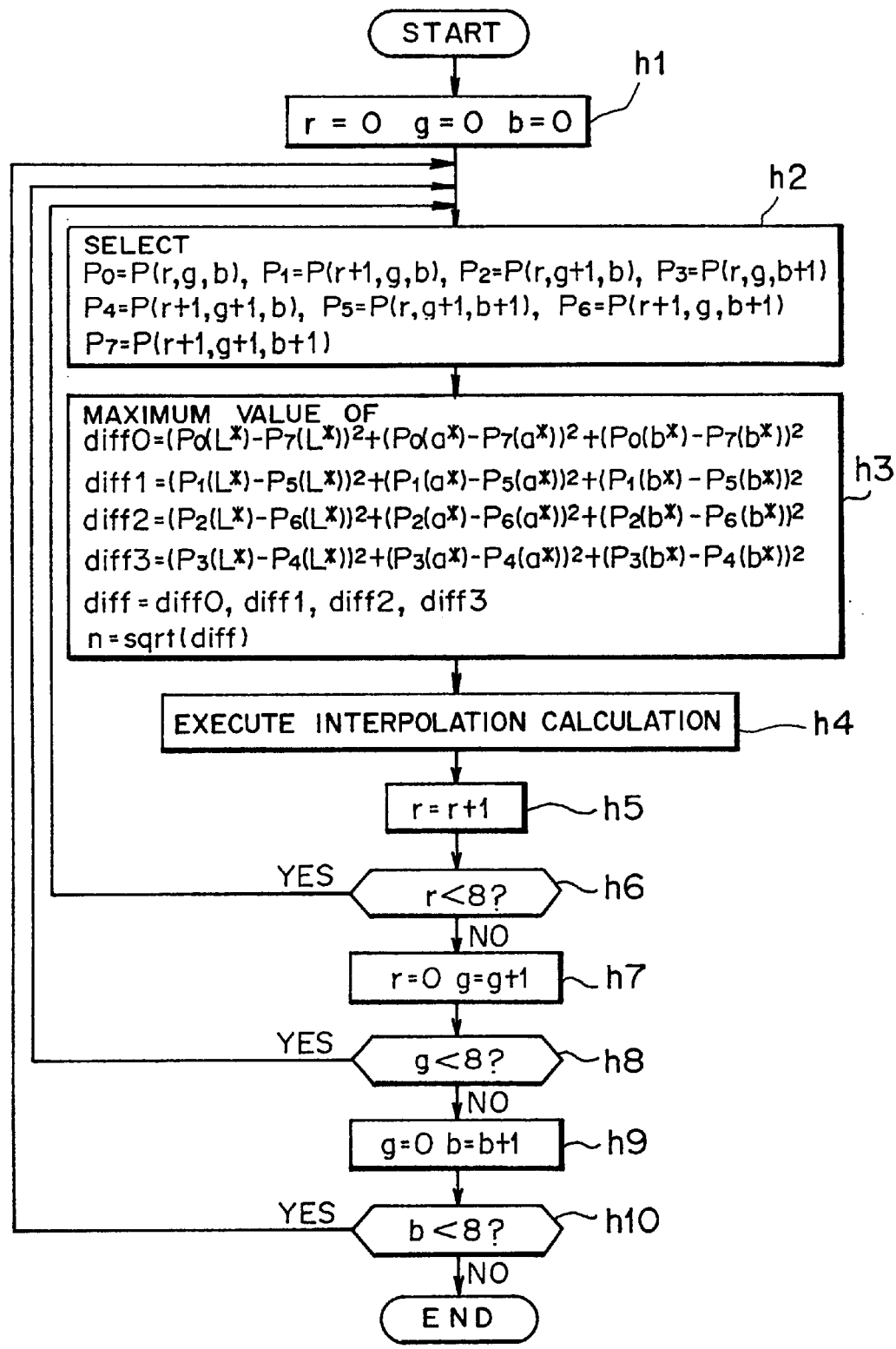
FIG. 23 is a flow chart illustrating the color conversion table construction conversion method of the third embodiment of the present invention.

After a hexahedron (which is not a cube similarly as in the second embodiment) is selected in step h2 of FIG. 23, the computer 1B sets data production intervals in an L*a*b* space based on a data dispersion in one of the L*a*b* space and an RGB space (data production interval setting step).

More particularly, in the present third embodiment, as seen in FIG. 23, data production intervals in the RGB space are set in accordance with the expressions (3) used in the first embodiment based on intervals of color data in the L*a*b* space corresponding to distances of color data in the RGB space (step h3 of FIG. 23).

For example, based on distances between grid points of RGB values formed in such an L*a*b* space as shown in FIG. 14(b), distances between grid points (intervals of data production) in such an RGB space as illustrated in FIG. 14(a) are set.

In particular, since, in the L*a*b* space, the distribution intervals of intersecting points of solid lines are not uniform, that is, since a larger distance is exhibited on the upper side in FIG. 14(b), the coincidence degree of RGB values with intersecting points of broken lines is lower on the upper side than on the lower side.

Therefore, in the present embodiment, the ratio at which the distance between intersecting points of solid lines on the upper side is set larger by the data production interval setting described above so that the distances in distribution of points of L*a*b* values in the L*a*b* space may be uniform. In short, the ratio at which a hexahedron in the RGB space is divided (that is, the number n of division of each side of a cube) is varied in accordance with the distances in distribution of the L*a*b* values in the L*a*b* space.

It is to be noted that, in the present third embodiment, the data production intervals in the RGB space may be set alternatively based on the data distances in the RGB space. In particular, since the two color spaces in the present embodiment are not color spaces which have grid-like distributions as seen in FIGS. 14(a) and 14(b), the data production distances in the RGB space can be set from the data distances in the RGB space itself.

In this instance, $P_x(L^*)$, $P_x(a^*)$ and $P_x(b^*)$ (values of apexes of a cube) indicated by the expressions (3) given hereinabove can be replaced with $P_x(R)$, $P_x(G)$ and $P_x(B)$ (values of apexes of a hexahedron) to calculate them.

Accordingly, since data production intervals can be set similarly as in the first embodiment, data produced in the RGB space are not one-sided but have a uniform distribution.

After the data production intervals (n) corresponding to the selected cube are set, the computer 1B performs interpolation calculation processing in such a manner as described above (step g6 of FIG. 22 and step h4 of FIG. 23). In particular, here, interpolation calculation processing with data registered in the first color conversion table 48 is performed to increase corresponding relationships of colors between the L*a*b* space and the RGB space (data production step).

It is to be noted that, also in regard to the data production step, similarly as in the first embodiment and the second embodiment described hereinabove, the intervals for data setting may first be set larger to effect processing (processing is effected with a comparatively low value of n) to restrict colors of data to those around particular colors (for example, colors whose data are actually registered by the processing performed with the larger intervals), whereafter the intervals are set smaller (the value of n is set to a comparatively high value) to effect interpolation calculation and data registration processing into the second color conversion table 49 again, or data may be increased by weighted averagingcalculation of two or more data.

After data representative of corresponding relationships between the RGB space and the L*a*b* space are increased by the interpolation calculation processing in this manner (data production step), the computer 1B selects some data from either one or both of the data which construct the first color conversion table 48 and the data increased by the data production step (data selection step).

In short, corresponding relationships between the values of colors in the L*a*b* space and the values of colors in the RGB space are increased without performing such processing for increasing corresponding relationships to coefficients necessary for color production calculation in the L*a*b* space as in the second embodiment.

It is to be noted that a data selection method (steps g7 to g12 illustrated in FIG. 22) is similar to that in the second embodiment (steps d7 to d12 illustrated in FIG. 15), but it is different in that, while, in the second embodiment, L*a*b* color production data are registered in the second color conversion table 45, in the third embodiment, L*a*b* values are registered directly in the second color conversion table 49.

Figure 24:
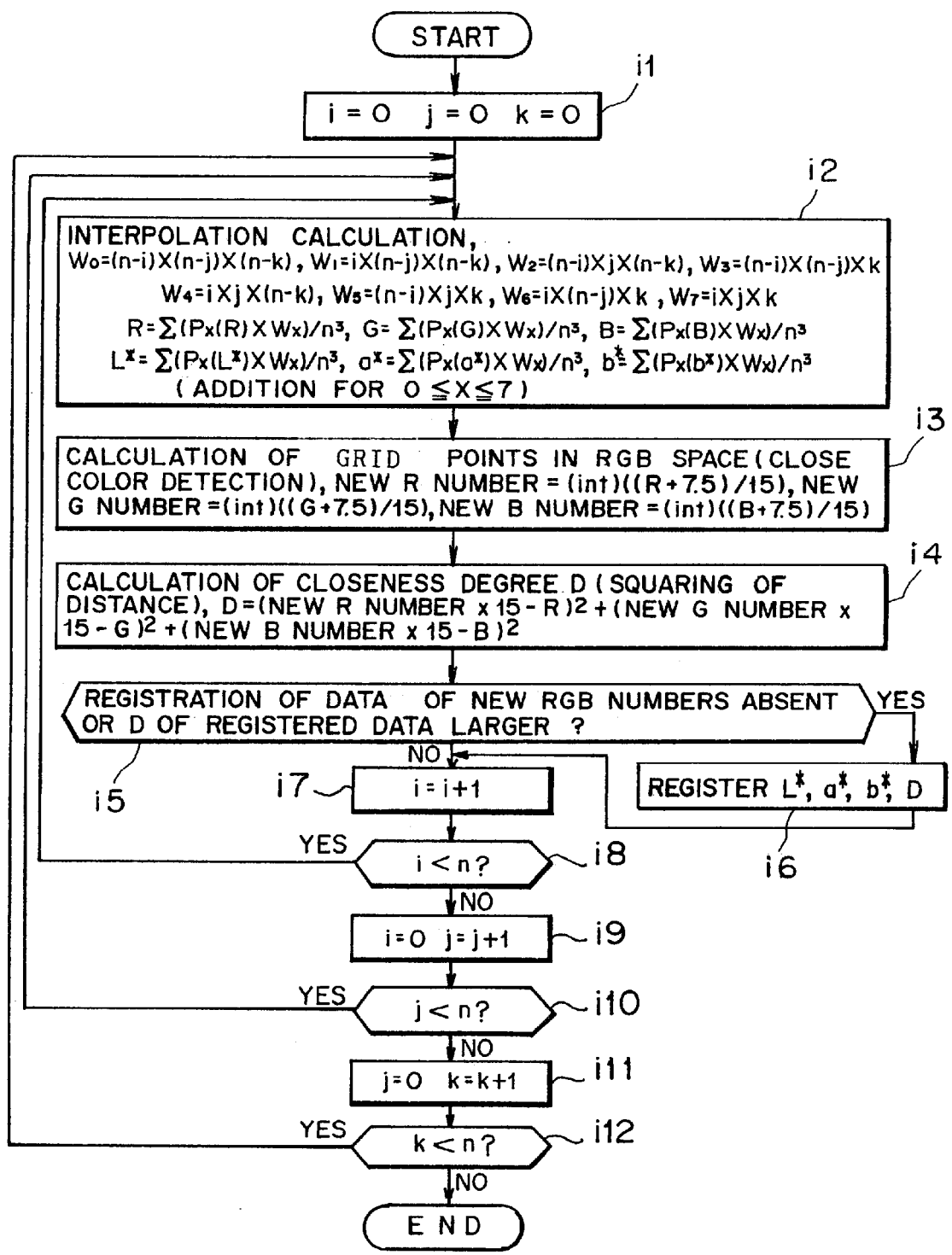
FIG. 24 is a flow chart illustrating the color conversion table construction conversion method of the third embodiment of the present invention.
Figure 25:
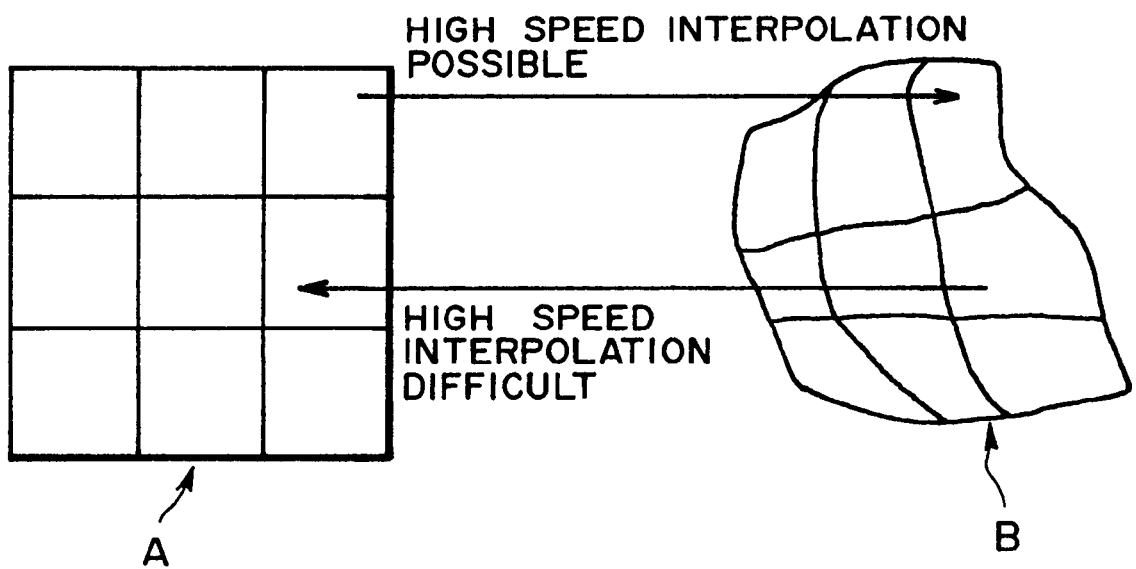
FIG. 25 is a diagrammatic view illustrating corresponding relationships of colors between two different color spaces.

Also processing in steps i1 to i12 of FIG. 24 is similar to that in steps f1 to f12 of FIG. 20, but it is different in that L*a*b* values are calculated in step i2 of FIG. 24 and registered into the second color conversion table 49 (step i6 of FIG. 24; L*a*b* value and D registration). Further, also processing for the individual directions in the RGB space in steps h5 to h10 of FIG. 23 is similar to that in steps e4 to e9 of FIG. 19 described hereinabove.

Further, production processing of a new table (second color conversion table 49) described above is executed by a CPU (not shown) in the computer 1B (refer to FIG. 21) reading out the color conversion program 50 in the storage apparatus 4B and operating in accordance with the program. The color conversion program 50 is stored into the storage apparatus 4B by the computer 1B as a recording medium such as a floppy disk on which the color conversion program 50 is recorded is installed into the computer 1B.

In this manner, with the color space conversion apparatus 10B described above, since a color conversion table can be produced without depending upon such a method wherein it is produced using coefficients as in the second embodiment described above, a high performance can be achieved.

e. Others

It is to be noted that, also in such processing of a color conversion table of the printer 2 as in the first embodiment described hereinabove, the interpolation processing (color production processing) may be performed such that, as in the second embodiment, only YMC numbers and YMC interpolation coefficients are registered first and YMC values are calculated collectively in the last without performing calculation of YMC values (mapping into the YMC space) intermediately. It is to be noted that the conversion expressions in this instance are given as the following expressions (15):

$$Y=255.0\times(y+i/n)/8.0$$

$$M=255.0\times(m+j/n)/8.0$$

$$C=255.0\times(c+k/n)/8.0 \tag{15}$$

This can reduce the processing time comparing with the first embodiment.

The present invention is not limited to the specifically described embodiment, and variations and modifications may be made without departing from the scope of the present invention.

What is claimed is:

1. A method of converting construction of a color conversion table representative of corresponding relationships of colors between a first color space and a second color space, comprising:

producing data representative of the corresponding relationships of colors by setting data production intervals in the first color space based on a data dispersion in one of the first color space and the second color space;

increasing the data produced in the data production intervals;

selecting a data which has not been registered in an originally constructed color conversion table from said increased data;

selecting a data present at or closer to a grid point of said second color space from either one of data of the color conversion table and the increased data; and constructing a converted color conversion table based on the selected data.

2. A method of converting construction of a color conversion table according to claim 1, further comprising producing data representative of the corresponding relationships of colors by setting data production intervals in the first color space based on data intervals in the second color space corresponding to data intervals in the first color space.

3. A method of converting construction of a color conversion table according to claim 1, further comprising producing data representative of the corresponding relationships of colors by setting data production intervals in the first color space based on data intervals in the first color space.

4. A computer-readable recording medium having a color conversion table construction conversion program recorded thereon, the color conversion table construction conversion program causing, in order to convert a construction of a color conversion table representative of corresponding relationships of colors between a first color space and a second color space, a computer to execute:

a data production interval setting procedure that sets data production intervals in the first color space based on a data dispersion in one of the first color space and the second color space;

a data production procedure that increases the number of data representative of the corresponding relationships of colors at the data production intervals obtained by the data production interval setting procedure;

a first data selection procedure that selects a data which has not been registered in an originally constructed color conversion table from said increased data;

a second data selection procedure that selects a data present at or closer to a grid point of said second color space from either one of data of the color conversion table and the data increased by the data production procedure; and a converted color conversion table construction procedure that constructs a converted color conversion table based on the selected data.

5. A method of converting construction of a color conversion table according to claim 1, wherein increasing the data produced in the data production intervals further comprises increasing the number of data representative of the corresponding relationships of colors with a first data production interval in a first data production operation and increasing the number of data representative of the corresponding relationships of colors with a second data production interval smaller than the first data production interval in a second data production operation.

6. A method of converting construction of a color conversion table according to claim 1, wherein increasing the data produced in the data production intervals further comprises increasing data by weighted averaging calculation of two or more data.

7. A method of converting construction of a color conversion table according to claim 1, further comprising:

detecting, from among colors set in advance, a color which is closest to each color in the second color space corresponding to the data which originally construct the color conversion table and the increased data;

calculating a closeness degree of each of the detected colors; and comparing closeness degrees of other data which have a previously calculated closeness degree and the calculated closeness degree of each of the detected colors; wherein the selecting of data which has not been registered in an originally constructed color conversion table from said increased data further comprises selecting data having a comparatively high closeness degree based on a result of the comparison.

8. A method of converting construction of a color conversion table according to claim 7, further comprising comparing the calculated closeness degrees with a reference value, and selecting data having a comparatively high closeness degree from among those closeness degrees which have been detected to be lower than the reference value.

9. A method of converting construction of a color conversion table according to claim 1, wherein a user designates data which define data production intervals.

10. A method of converting construction of a color conversion table representative of corresponding relationships of colors between a first color space and a second color space, comprising:

producing data corresponding to relationships between colors in the second color space and coefficients necessary for production calculation of colors in the first color space corresponding to the colors in the second color space to increase a number of data representative of the corresponding relationships of colors;

selecting a data which has not been registered in an originally constructed color conversion table from said increased data;

selecting a data at or closer to a grid point of said second color space from either one of the data of the the color conversion table and the increased data;

calculating, regarding the selected data, colors in the first color space from coefficients necessary for color production calculation in the first color space generated by the produced data, and constructing a converted color conversion table based on the selected data.

11. A method of converting construction of a color conversion table according to claim 10, wherein the first color space is a color space of a color information inputting device.

12. A computer-readable recording medium having a color conversion table construction conversion program recorded thereon, wherein to construct a converted color conversion table representative of corresponding relationships of colors between a first color space and a second color space the color conversion table construction conversion program causing a computer to execute:

a data production procedure that produces corresponding relationships between colors in the second color space and coefficients necessary for production calculation of colors in the first color space corresponding to the colors in the second color space to increase data representative of the corresponding relationships of colors;

a first data selection procedure that selects a data which has not been registered in an originally constructed color conversion table from said increased data;

a second data selection procedure that selects a data present at or closer to a grid point of said second color space from either one of data of the color conversion table and the data increased by the data production procedure;

a color calculation procedure that calculates, regarding the selected data selected, colors in the first color space from coefficients necessary for color production calculation in the first color space produced by the data production procedure; and a converted color conversion table construction procedure that constructs a converted color conversion table based on results of the color calculation procedure.

13. A method of converting construction of a color conversion table according to claim 10, wherein producing data further comprises increasing the number of data representative of the corresponding relationships of colors with a first data production interval and increasing the number of data representative of the corresponding relationships of colors with a second data production interval smaller than the first data production interval.

14. A method of converting construction of a color conversion table according to claim 10, wherein producing data further comprises increasing data by weighted averaging calculation of two or more data.

15. A method of converting construction of a color conversion table according to claim 10, further comprising:

detecting, from among colors set in advance, a color which is closest to each of colors in the second color space corresponding to the data which originally construct the color conversion table and the increased data;

calculating a closeness degree of each of the detected close colors; and comparing closeness degrees of other data for each of which a closeness degree has been previously calculated and the calculated closeness degree of each of the detected close colors;

wherein the selecting of data which has not been registered in an originally constructed color conversion table from said increased data further comprises selecting data having a comparatively high closeness degree based on a result of the comparison.

16. A method of converting construction of a color conversion table according to claim 15, further comprising:

comparing the calculated closeness degrees with a reference value, and selecting data having a comparatively high closeness degree from among those closeness degrees which have been detected to be lower than the reference value.

17. A method of converting construction of a color conversion table according to claim 10, wherein a user designates data which define-data production intervals.

* * * * *

UNITED STATES PATENT AND TRADEMARK OFFICE
CERTIFICATE OF CORRECTION

PATENT NO. : 6,275,607 B1  
DATED : August 14, 2001  
INVENTOR(S) : Masayoshi Shimizu Page 1 of 1

It is certified that error appears in the above-identified patent and that said Letters Patent is hereby corrected as shown below:

Column 33,
Line 24, delete "the" (second occurrence)

Column 34,
Line 53, remove the "-" between the words "define-data"

Signed and Sealed this

Twelfth Day of March, 2002

Attest:

JAMES E. ROGAN
Attesting Officer
Director of the United States Patent and Trademark Office